United States Patent
Ueda et al.

(10) Patent No.: US 11,237,763 B2
(45) Date of Patent: Feb. 1, 2022

(54) STORAGE DEVICE AND MEMORY CONTROLLER

(71) Applicant: Kioxia Corporation, Tokyo (JP)

(72) Inventors: Yoshihiro Ueda, Yokohama Kanagawa (JP); Naomi Takeda, Yokohama Kanagawa (JP); Masanobu Shirakawa, Chigasaki Kanagawa (JP); Marie Takada, Yokohama Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 0 days.

(21) Appl. No.: 16/816,439

(22) Filed: Mar. 12, 2020

(65) Prior Publication Data

US 2021/0089233 A1 Mar. 25, 2021

(30) Foreign Application Priority Data

Sep. 19, 2019 (JP) .............................. JP2019-169957

(51) Int. Cl.
*G06F 3/06* (2006.01)
*G06F 11/10* (2006.01)
*G06F 12/10* (2016.01)

(52) U.S. Cl.
CPC ............ *G06F 3/0659* (2013.01); *G06F 3/064* (2013.01); *G06F 3/0604* (2013.01); *G06F 3/0673* (2013.01); *G06F 11/1068* (2013.01); *G06F 12/10* (2013.01); *G06F 2212/657* (2013.01)

(58) Field of Classification Search
CPC ...................................................... G06F 3/0659

USPC ................................. 714/764, 762, 765, 767
See application file for complete search history.

(56) References Cited

U.S. PATENT DOCUMENTS

| | | | |
|---|---|---|---|
| 7,944,729 B2 | 5/2011 | Chen et al. | |
| 8,255,613 B2 | 8/2012 | Abali et al. | |
| 9,236,106 B2 | 1/2016 | Nakamura | |
| 2004/0117710 A1* | 6/2004 | Patil | G01R 31/31921 714/739 |
| 2008/0080234 A1 | 4/2008 | Iwata et al. | |
| 2015/0380638 A1 | 12/2015 | Ootera et al. | |
| 2018/0024738 A1 | 1/2018 | Ngu | |
| 2018/0253347 A1* | 9/2018 | Shigeta | G06F 11/1004 |
| 2018/0261300 A1 | 9/2018 | Shimizu | |
| 2019/0066809 A1* | 2/2019 | Kumar | G06F 11/1072 |

(Continued)

FOREIGN PATENT DOCUMENTS

| | | |
|---|---|---|
| JP | 2008-90957 A | 4/2008 |
| JP | 2016-9806 A | 1/2016 |

(Continued)

*Primary Examiner* — Fritz Alphonse
(74) *Attorney, Agent, or Firm* — Finnegan, Henderson, Farabow, Garrett & Dunner L.L.P.

(57) ABSTRACT

According to one embodiment, a storage device includes a nonvolatile memory and a control circuit. The nonvolatile memory includes a plurality of storage blocks, each including a shift register. The control circuit controls writing and reading of data to and from the nonvolatile memory. The control circuit is configured to: read target data from a first storage block of the plurality of storage blocks; and write the target data read from the first storage block to a second storage block of the plurality of storage blocks, the second storage block being different from the first storage block.

23 Claims, 33 Drawing Sheets

(56) References Cited

U.S. PATENT DOCUMENTS

2019/0088288 A1 3/2019 Tatsumura et al.
2020/0334105 A1* 10/2020 Berman .............. G06F 11/1068

FOREIGN PATENT DOCUMENTS

| JP | 2018-152146 A | 9/2018 |
| JP | 2019-57602 A | 4/2019 |

* cited by examiner

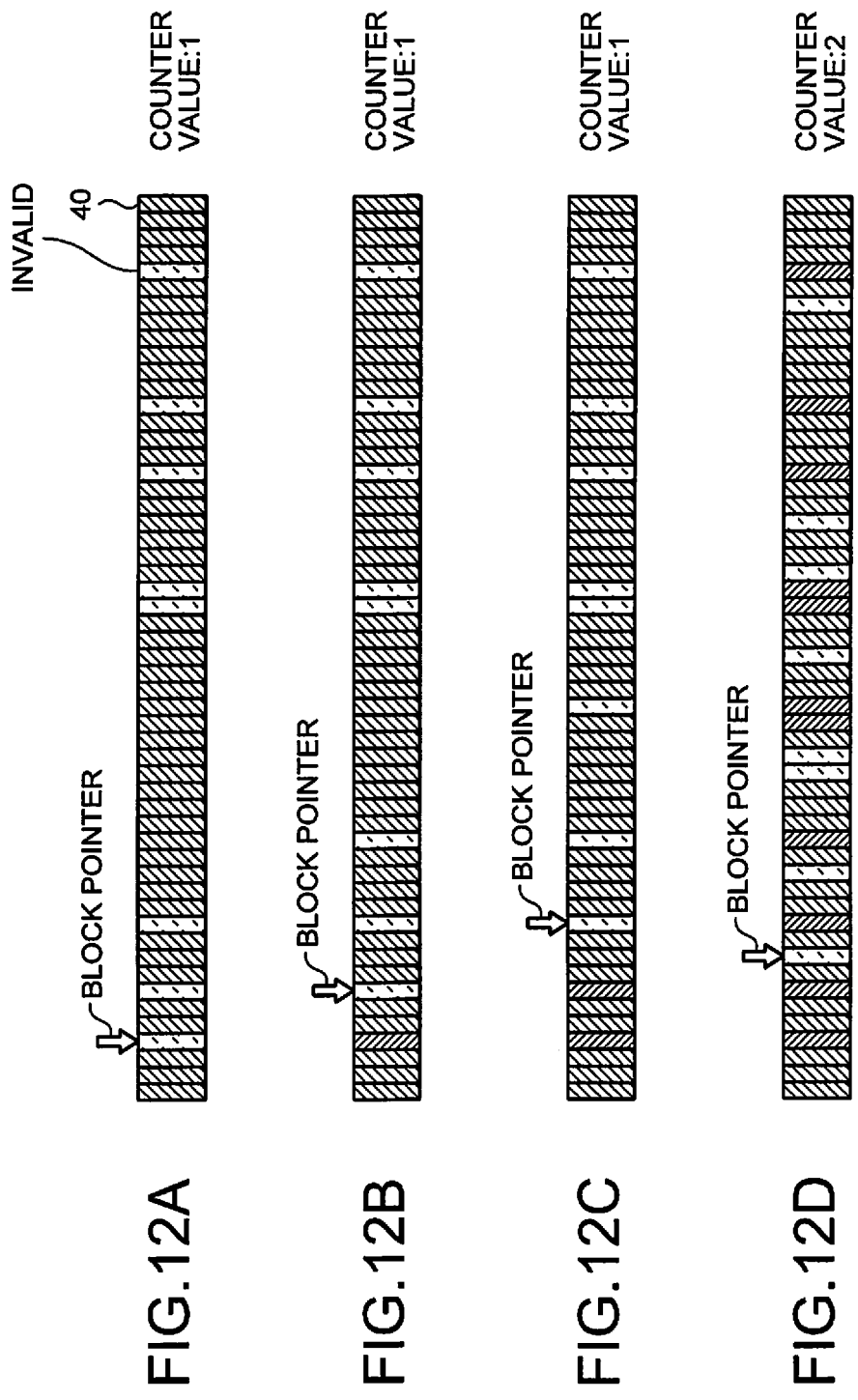

TIME

FIG.32A
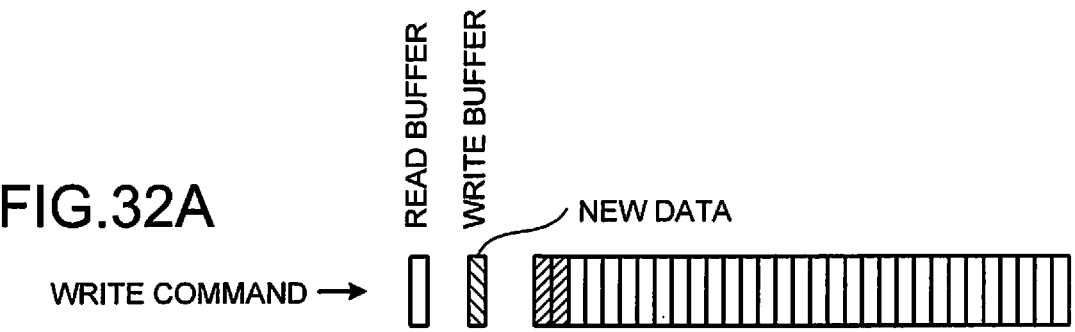
FIG.32B
FIG.32C
FIG.32D
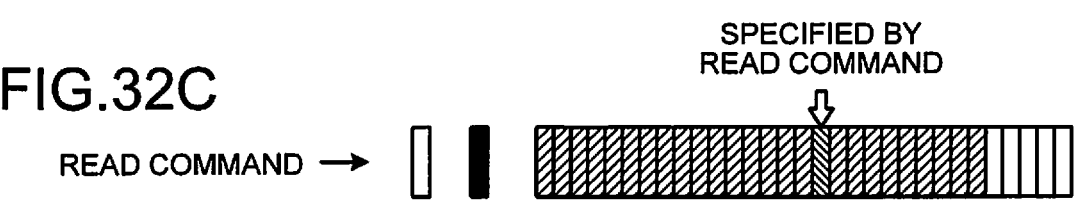
FIG.32E

STORAGE DEVICE AND MEMORY CONTROLLER

CROSS-REFERENCE TO RELATED APPLICATIONS

This application is based upon and claims the benefit of priority from Japanese Patent Application No. 2019-169957, filed on Sep. 19, 2019; the entire contents of which are incorporated herein by reference.

FIELD

Embodiments described herein relate generally to a storage device and a memory controller.

BACKGROUND

In a magnetic body, a phenomenon called a magnetic domain wall shift, in which a magnetic domain wall moves in a longitudinal direction of a thin wire, arises by making a current flow. A magnetic domain wall moving memory has been proposed, which stores a large number of magnetic domains in a magnetic body formed on a substrate using a principle of the magnetic domain wall shift.

Such a magnetic domain wall moving memory includes a plurality of storage blocks. Each of the plurality of storage blocks functions as a shift register. Besides the magnetic domain wall moving memory, a memory device including a shift register type storage block has also been known.

In such memory devices, when data is read from the shift register type storage block, data stored in the storage block is destroyed. Therefore, in such a memory device, when data is read, the read data needs to be rewritten to the storage block again. However, when data stored in a specific storage block is repeatedly read, fatigue is concentrated on the specific storage block.

BRIEF DESCRIPTION OF THE DRAWINGS

FIGS. 12A to 12D are diagrams for explaining writing, reading, and updating of data in the first embodiment;

FIGS. 32A to 32E are diagrams for explaining writing, reading, and updating of data in the sixth embodiment;

DETAILED DESCRIPTION

Figure 1:
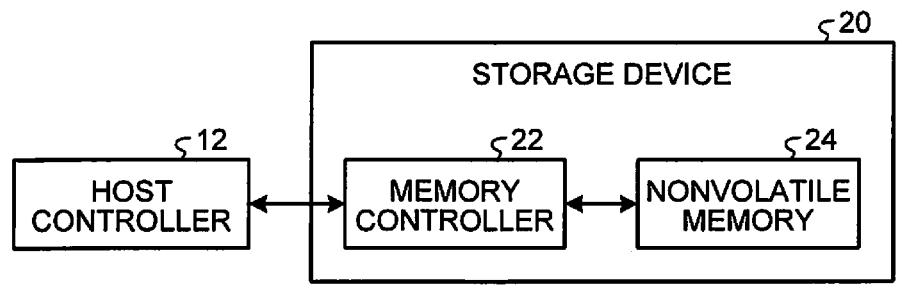
FIG. 1 is a diagram illustrating a configuration of an information processing apparatus.

In general, according to one embodiment, a storage device is provided. The storage device includes a nonvolatile memory and a control circuit. The nonvolatile memory includes a plurality of storage blocks, each including a shift register. The control circuit controls writing and reading of data to and from the nonvolatile memory. The control circuit is configured to: read target data from a first storage block of the plurality of storage blocks; and write the target data read from the first storage block to a second storage block of the plurality of storage blocks, the second storage block being different from the first storage block.

Hereinafter, embodiments will be described with reference to the drawings. In the following description, components having the same function and configuration are denoted by the same reference numerals. Further, each embodiment described below illustrates an apparatus or method for embodying the technical idea of this embodiment, and materials, shapes, structures, arrangements, and the like of components are not limited to those described below.

First Embodiment

FIG. 1 is a diagram illustrating a configuration of an information processing apparatus 10. An information processing apparatus 10 includes a host controller 12 and a storage device 20.

The host controller 12 has one or more processors. The processor is, for example, one or more central processing units (CPUs). The host controller 12 executes a program and processes data. The host controller 12 reads data from the storage device 20 or writes data in the storage device 20 according to the execution of the program.

Note that the host controller 12 may be any device as long as the host controller 12 can execute data processing. The host controller 12 may be information processing equipment including a processor, or may be a circuit other than a CPU, such as a field programmable gate array (FPGA) or a dedicated circuit.

The storage device 20 is connected to the host controller 12 over a bus. The storage device 20 may be connected to the host controller 12 over an interface such as a universal serial bus (USB). The storage device 20 stores data received from the host controller 12 in response to a command from the host controller 12. In addition, the storage device 20 transmits the stored data to the host controller 12 in response to the command from the host controller 12.

The storage device 20 has a memory controller 22 and a nonvolatile memory 24. The nonvolatile memory 24 is a memory that keeps data storing even when a supply of power is stopped.

The memory controller 22 controls transmission and reception of data to and from the host controller 12. In addition, the memory controller 22 controls reading and writing of data from and in the nonvolatile memory 24. The memory controller 22 writes data to the nonvolatile memory 24 in response to the command received from the host controller 12. The memory controller 22 reads data from the nonvolatile memory 24 in response to the command received from the host controller 12, and transmits the data to the host controller 12.

Figure 2:
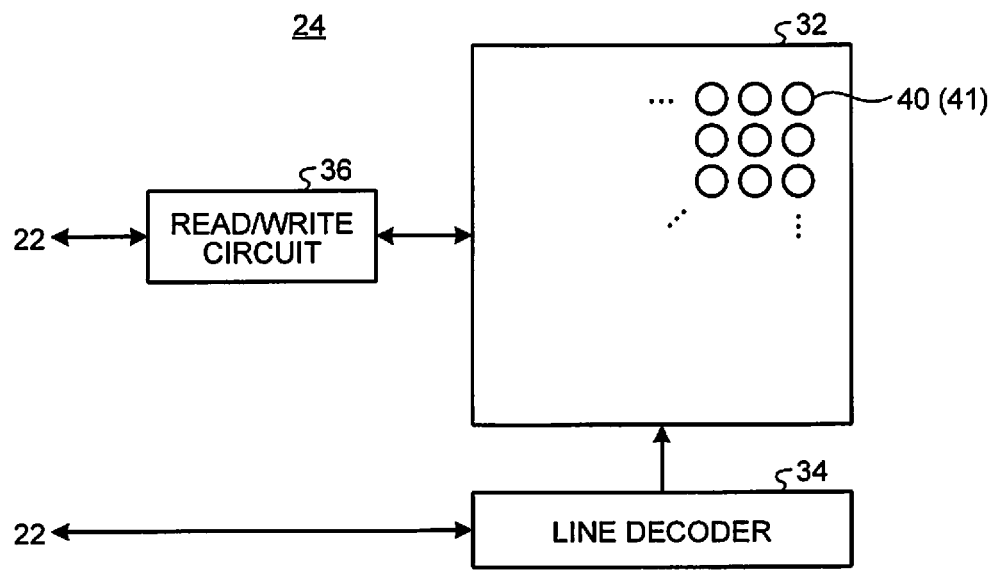
FIG. 2 is a diagram illustrating a configuration of a nonvolatile memory.

FIG. 2 is a diagram illustrating a configuration of the nonvolatile memory 24. The nonvolatile memory 24 is implemented by a semiconductor device. The nonvolatile memory 24 includes a memory array 32, a line decoder 34, and a read/write circuit 36.

The memory array 32 has a plurality of storage blocks 40. Each of the plurality of storage blocks 40 includes a shift register that stores pieces of data. Each of the plurality of storage blocks 40 may include one shift register, or may include a plurality of shift registers. In addition, each of the plurality of storage blocks 40 is assigned an inherent physical address.

Each of the plurality of storage blocks 40 may be a last in, first out (LIFO) type shift register, or may be a first in, first out (FIFO) type shift register. The storage block 40 stores plural pieces of data. The size of each of the pieces of data is, for example, 1 bit. When the storage block 40 includes a single shift register, plural pieces of data are sequentially written in the shift register one by one from the initial data to the final data.

The line decoder 34 is assigned a physical address for specifying the storage block 40 to be read or to be written from the memory controller 22 at the time of writing and reading data. The line decoder 34 controls an internal state of the memory array 32 so that pieces of data can be read or written from or in the storage block 40 of the given physical address.

The read/write circuit 36 receives a writing instruction and target data (pieces of data) from the memory controller 22 at the time of writing data. The read/write circuit 36 writes the received target data (pieces of data) in the storage block 40 that can be written by the line decoder 34 at the time of writing data.

The read/write circuit 36 receives a reading instruction from the memory controller 22 at the time of reading data. The read/write circuit 36 reads target data (pieces of data) from the storage block 40 that can be read by the line decoder 34 at the time of reading data. Then, the read/write circuit 36 supplies the read target data (pieces of data) to the memory controller 22 at the time of reading data.

In the embodiment, each of the plurality of storage blocks 40 includes one or more storage units 41 that magnetically store information. The storage unit 41 functions as one shift register. The storage unit 41 is capable of holding pieces of magnetization information in a predetermined direction by using a principle of a magnetic domain wall shift. For example, the storage unit 41 has an elongated shape, and can hold pieces of magnetization information in a lengthwise direction. Note that the "magnetization information" refers to a unit of information magnetically written in the storage unit 41 by one-time write. When two pieces of magnetization information having different magnetization directions are written in the storage unit 41, a magnetic domain wall arises between the two pieces of magnetization information. When the two pieces of magnetization information having the same magnetization direction are written, no magnetic domain wall arises between the two pieces of magnetization information.

Note that, when each of the plurality of storage blocks 40 includes a shift register, each of the plurality of storage blocks 40 is not needed to include such a storage unit 41. Each of the plurality of storage blocks 40 may be a shift register implemented by, for example, an oxide semiconductor containing indium, gallium, and zinc.

Figure 3:
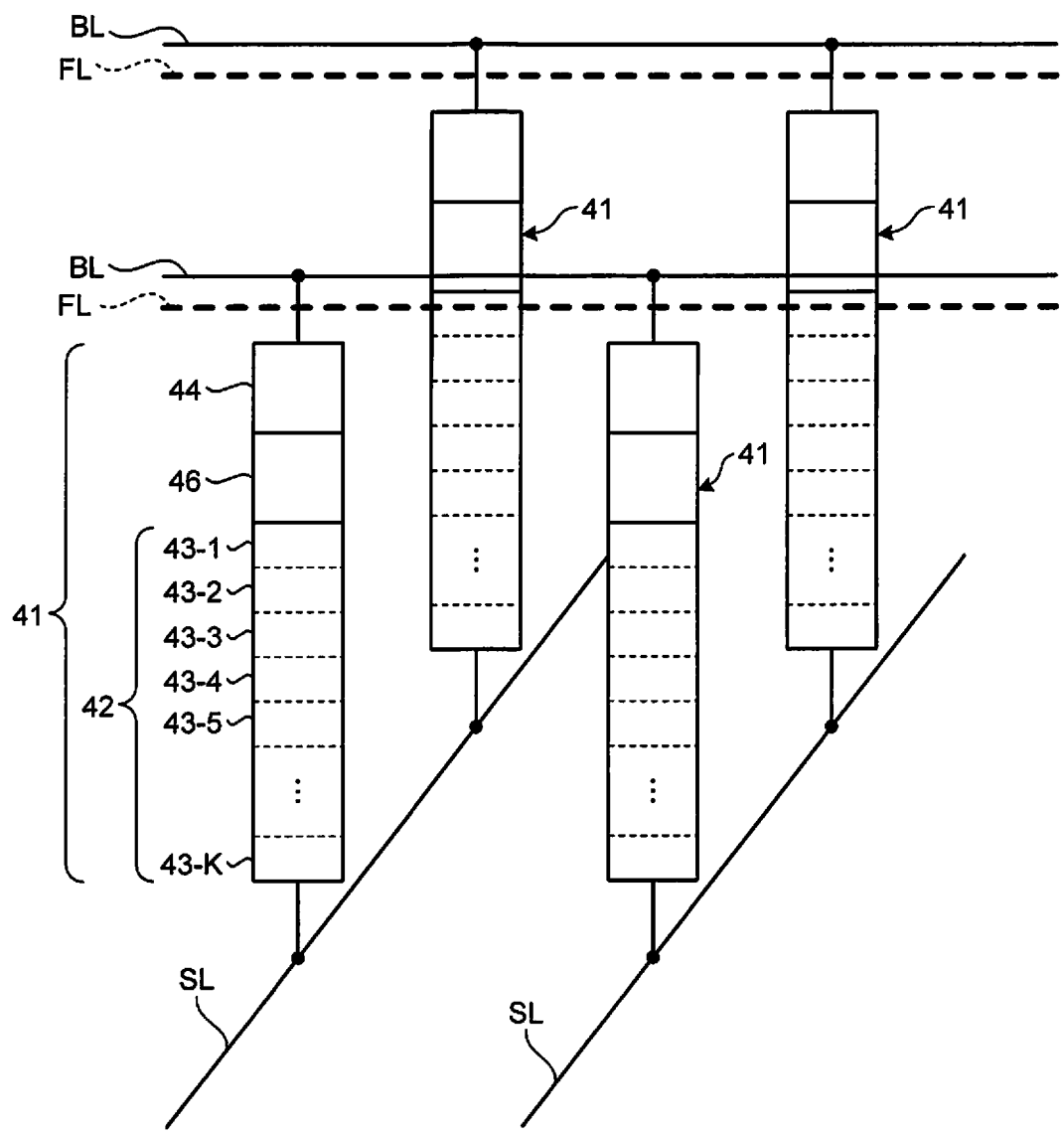
FIG. 3 is a diagram schematically illustrating a configuration of part of a memory array.

FIG. 3 is a diagram schematically illustrating a configuration of part of a memory array 32. The memory array 32 includes a plurality of storage units 41, a plurality of bit lines BL, a plurality of source lines SL, and a plurality of field lines FL.

The plurality of storage units 41 are arranged to correspond to a two-dimensional matrix on a plane (X-Y plane) of a semiconductor substrate. Here, on the substrate, while a row direction of the matrix is defined as an X direction, a column direction is defined as a Y direction. In addition, on the substrate, a direction perpendicular to the plane of the substrate is defined as a Z direction. The X, Y, and Z directions are orthogonal to each other.

Each of the plurality of bit lines BL is substantially linear wiring, and extends in the X direction. The plurality of bit lines BL are arranged in parallel at equal intervals.

Each of the plurality of source lines SL is substantially linear wiring, and extends in the Y direction. The plurality of source lines SL are arranged in parallel at equal intervals. The plurality of source lines SL are formed at positions (that is, at different layers) in the Z direction different from the plurality of bit lines BL.

Each of the plurality of field lines FL is substantially linear wiring, and extends in the X direction. The plurality of field lines FL are arranged in parallel at equal intervals.

In addition, the plurality of field lines FL are formed at positions (that is, at different layers) in the Z direction different from the plurality of bit lines BL and the plurality of source lines SL. More specifically, the plurality of field lines FL are formed in a layer, which is near the bit line BL, between the plurality of bit lines BL and the plurality of source lines SL. Further, each of the plurality of field lines FL is provided near a bit line BL provided corresponding to the same row at a position in the Y direction.

Each of the plurality of storage units 41 is formed in the layer between the plurality of bit lines BL and the plurality of source lines SL. Each of the plurality of storage units 41 is provided in an intersection area between the plurality of bit lines BL and one source line SL.

Each of the plurality of storage units 41 includes a magnetic body portion 42, a switch element 44, and a read element 46.

The magnetic body portion 42 is a linear strong magnetic body having conductivity. The magnetic body portion 42 is arranged to extend in a direction (Z direction) orthogonal to both the bit line BL and the source line SL.

The magnetic body portion 42 is capable to holding pieces of magnetization information in a predetermined direction (Z direction). Each of the pieces of magnetization information is information magnetized in one of two recording directions according to the recording information. The magnetic body portion 42 shifts the held magnetization information in a predetermined direction in response to a shift pulse current having a predetermined current amount flowing in the predetermined direction (Z direction).

One end of the magnetic body portion 42 in the Z direction is electrically connected to the corresponding one of the plurality of source lines SL. The other end of the magnetic body portion 42 in the Z direction (end opposite to the source line SL) can be electrically connected to the corresponding one of the plurality of bit lines BL over the read element 46 and the switch element 44. Therefore, when the switch element 44 is in an ON state, the magnetic body portion 42 can be supplied with a current from the corresponding bit line BL and source line SL to move the held magnetization information in the predetermined direction (Z direction).

Here, an area in which one piece of magnetization information is held in the magnetic body portion 42 is referred to as a memory area 43. For example, when the magnetic body portion 42 can hold up to K (K is an integer of 2 or more) pieces of magnetization information, the magnetic body portion 42 includes K memory areas 43 of a first memory area 43-1_ to a K-th memory area 43-K in the predetermined direction (Z direction). In the present embodiment, among the K memory areas 43, the area on the read element 46 side in the magnetic body portion 42 is referred to as a first memory area 43-1 and the area on the source line SL side is referred to as a K-th memory area 43-K.

The switch element 44 is a two-terminal element connected in series to the magnetic body portion 42. More specifically, one end of the switch element 44 in the Z direction is electrically connected to the corresponding one of the plurality of bit lines BL. The other end of the switch element 44 is connected to the end (first memory area 43-1) on the side of the magnetic body portion 42 to which the source line SL is not connected over the read element 46.

The switch element 44 electrically connects or disconnects between one end (first memory area 43-1) in the magnetic body portion 42 and the corresponding one bit line BL. Therefore, when the switch element 44 is in the ON state (connected state), the read/write circuit 36 causes a current to flow between the corresponding bit line BL and the corresponding source line SL, thereby causing a current to flow through the read element 46 and the magnetic body portion 42.

The switch element 44 is changed to an ON state from an OFF state when a voltage equal to or higher than a predetermined value is applied. The switch element 44 maintains the ON state when a current equal to or greater than a holding current value continues to flow in the ON state. The switch element 44 may contain, for example, at least one or more chalcogen elements selected from the group consisting of Te, Se, and S. Alternatively, the switch element 44 may contain chalcogenide, which is a compound containing such a chalcogen element. The switch element 44 may further contain at least one or more elements selected from the group consisting of B, Al, Ga, In, C, Si, Ge, Sn, As, P, and Sb.

The read element 46 is electrically connected to the end (first memory area 43-1) on the side of the magnetic body portion 42 to which the source line SL is not connected. Further, the read element 46 is also magnetically connected to the end (first memory area 43-1) of the magnetic body portion 42, and reads the magnetization direction from the magnetization information held at the end (first memory area 43-1) of the magnetic body portion 42.

The read element 46 is, for example, a magnetoresistance effect element. Therefore, the read element 46 changes its magnetization direction in accordance with the magnetization direction indicated by the magnetization information held at the end (first memory area 43-1) of the magnetic body portion 42. Further, a resistance value of the read element 46 is changed in accordance with the magnetization direction indicated by the held magnetization information. Accordingly, the read/write circuit 36 is capable of reading the magnetization direction from the magnetization information held at the end (first memory area 43-1) of the magnetic body portion 42. In the embodiments, the read element 46 is a magnetic tunnel junction (MTJ) element.

The end (first memory area 43-1) of the magnetic body portion 42 included in each of the plurality of storage units 41 is magnetically connected to the corresponding one of the plurality of field lines FL.

Each of the plurality of field lines FL passes near the end (first memory area 43-1) of the magnetic body portion 42 included in the storage unit 41 that is included in the corresponding column. Therefore, when a current is flowed, each of the plurality of field lines FL can apply an induction field to the end (first memory area 43-1) of the magnetic body portion 42 that is included in the corresponding storage unit 41.

That is, each of the plurality of field lines FL functions as a write element that writes the magnetization information in the magnetization direction corresponding to the recording information by an magnetic field generated by causing a current to flow in the end (first memory area 43-1) of the magnetic body portion 42 that is included in each of the one or more storage units 41 arranged in the corresponding column. Therefore, the read/write circuit 36 can magnetically write the recording information in the magnetic body portion 42 included in the target storage unit 41 by causing the current corresponding to the recording information to flow in the corresponding field line FL to generate an induction field.

Figure 4:
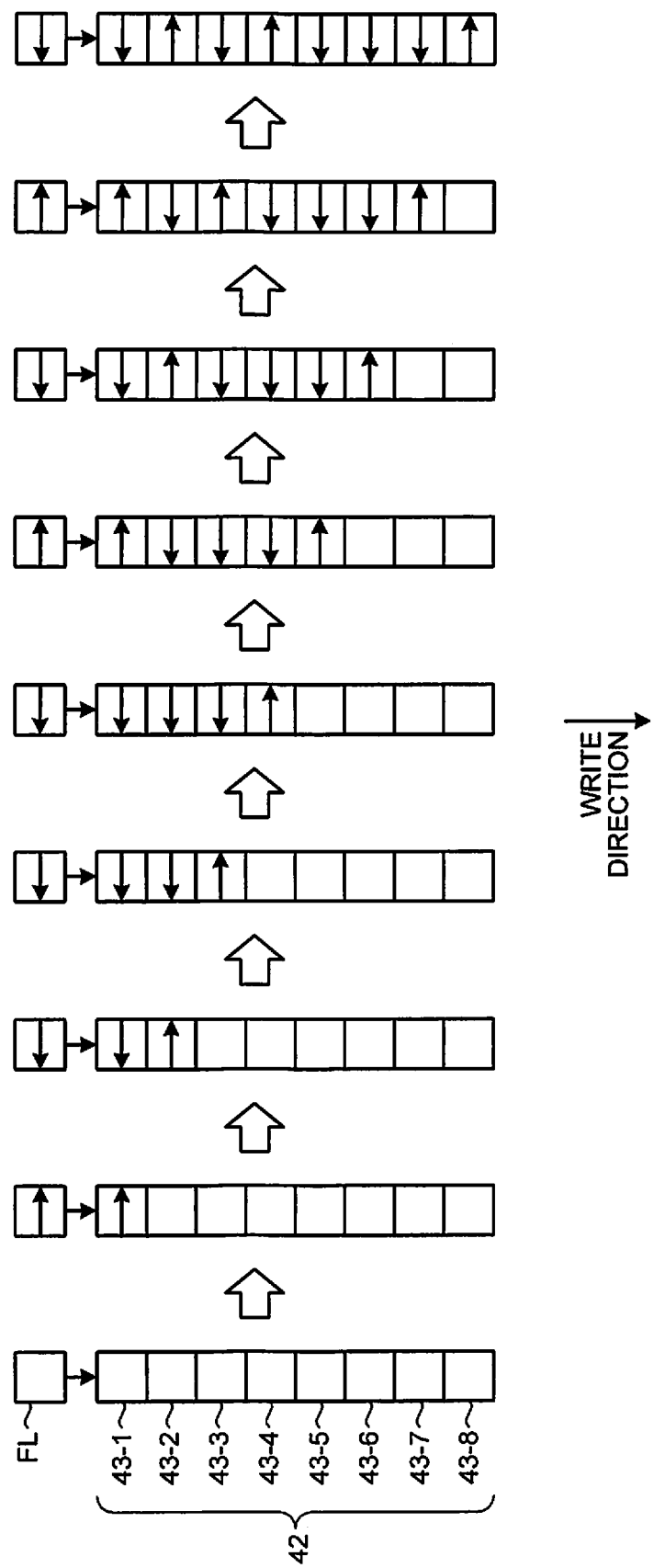
FIG. 4 is a diagram illustrating an example of magnetization information held in a magnetic body portion when written in a LIFO type storage block.

FIG. 4 is a diagram illustrating an example of the magnetization information held in the magnetic body portion 42 when written in the LIFO type storage unit 41. FIG. 4 depicts a case where the magnetic body portion 42 includes eight memory areas 43.

When the magnetization information is written in the storage unit 41, the switch element 44 included in the storage unit 41 becomes in a connected state. Therefore, when the magnetization information is written in the storage unit 41, the magnetic body portion 42 included in the storage unit 41 can be supplied with the shift pulse current in the writing direction from the read/write circuit 36.

By one-time write processing, one piece of magnetization information in the magnetization direction corresponding to the write current is written in an end of the magnetic body portion 42 on the write element (field line FL) side. After the write processing is completed once, the magnetic body portion 42 is supplied with a shift pulse current that causes all the pieces of magnetization information held in the magnetic body portion 42 to shift by one piece of magnetization information in a direction (direction from the first memory area 43-1 toward an eighth memory area 43-8) away from the end on the write element (field line FL) side. As a result, in the magnetic body portion 42, a gap can arise at the end (first memory area 43-1) on the write element (field line FL) side, and next new effective magnetization information can be written.

Thereafter, in the magnetic body portion 42, the write processing and the supply of the shift pulse current are alternately executed. When the first written magnetization information reaches the end (eighth memory area 43-8) opposite to the write element (field line FL) in the magnetic body portion 42, new magnetization information is not written in the magnetic body portion 42.

As described above, the new magnetization information is written in the end (first memory area 43-1) on the write element (field line FL) side while the magnetic body portion 42 sequentially shifts the already written magnetization information in a direction (writing direction) of a tail position.

Figure 5:
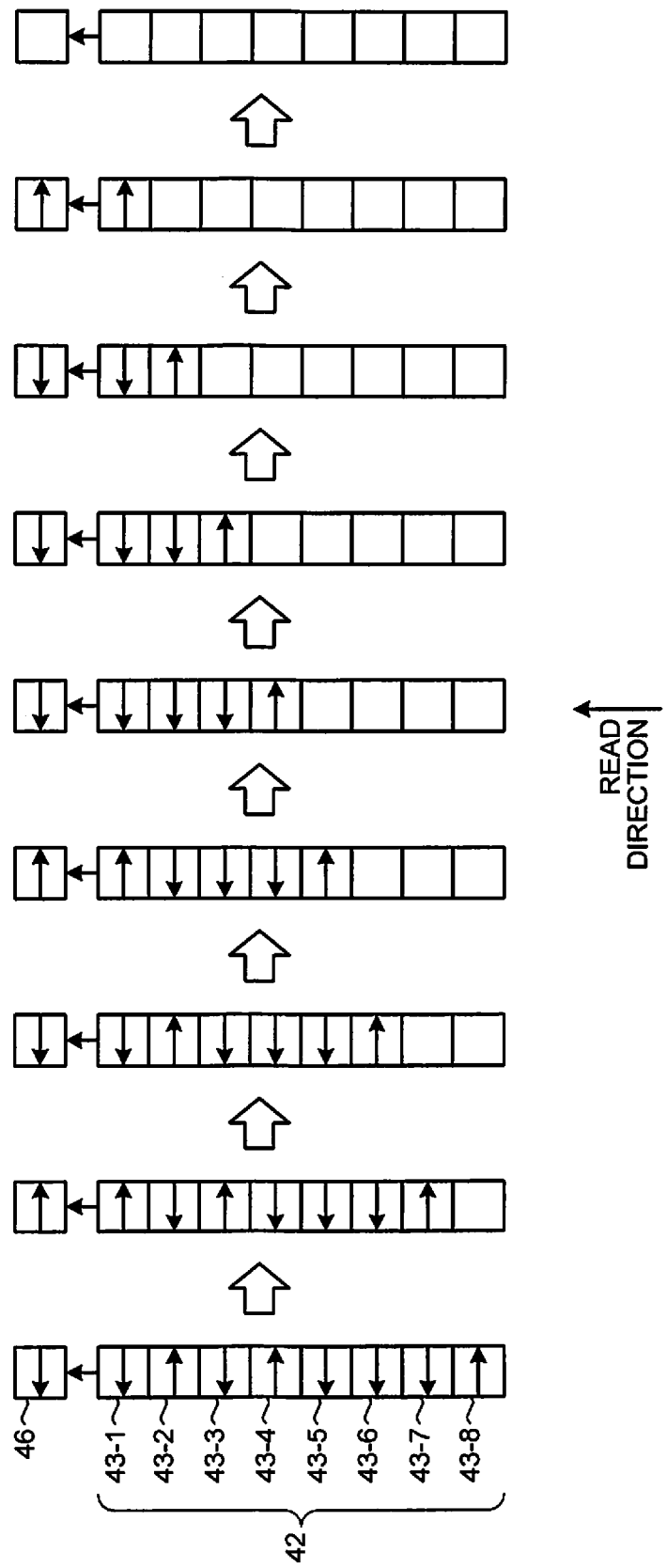
FIG. 5 is a diagram illustrating an example of the magnetization information held in the magnetic body portion at the time of reading data from the LIFO type storage block.

FIG. 5 is a diagram illustrating an example of the magnetization information held in the magnetic body portion 42 at the time of reading data from the LIFO type storage unit 41. FIG. 5 depicts a case where the magnetic body portion 42 includes eight memory areas 43.

When reading data from the storage unit 41, the switch element 44 included in the storage unit 41 is in a connected state. Therefore, when reading data from the storage unit 41, the magnetic body portion 42 included in the storage unit 41 can be supplied with the shift pulse current in the reading direction from the read/write circuit 36.

The magnetization direction of one piece of magnetization information is read at the end (first memory area 43-1) of the magnetic body portion 42 on the read element 46 side by one-time read processing. After the read processing is completed once, the magnetic body portion 42 is supplied with the shift pulse current that shifts all the pieces of held magnetization information by 1 magnetization information in a direction (in a direction from the eighth memory area 43-8 toward the first memory area 43-1) approaching the end on the read element 46 side. As a result, the magnetic body portion 42 can read the next magnetization information following the most recently read magnetization information.

Thereafter, in the magnetic body portion 42, the read processing and the supply of the shift pulse current are alternately executed. Then, when the tail magnetization information (magnetization information held at the position farthest away from the end on the read element 46 side, that is, the magnetization information stored in the eighth memory area 43-8) reaches the end on the read element 46 side, the magnetic body portion 42 becomes in a state in which all the pieces of magnetization information is read.

As described above, the magnetic body portion 42 sequentially reads the magnetization information while sequentially shifting the held magnetization information in a direction approaching the end (first memory area 43-1) on the read element 46 side.

Figure 6:
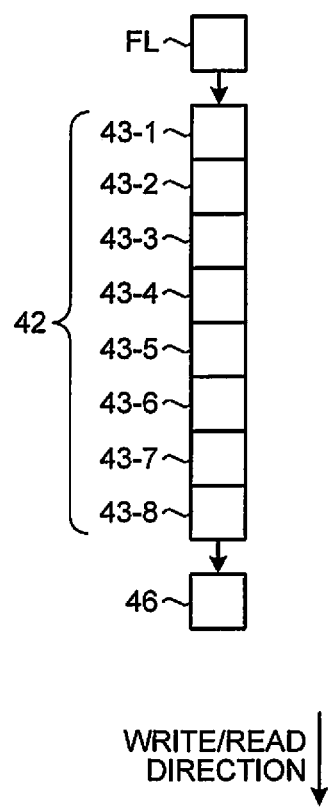
FIG. 6 is a diagram illustrating an arrangement of write elements (field lines (FL)) and read elements in a FIFO type storage block.

FIG. 6 is a diagram illustrating an arrangement of write elements (field lines (FL)) and read elements 46 in a FIFO type storage unit 41. FIG. 6 depicts a case where the magnetic body portion 42 includes eight memory areas 43.

The memory array 32 may have a configuration other than the configuration illustrated in FIGS. 3 to 5. Further, each of the plurality of storage units 41 may function as a FIFO type shift register instead of a LIFO type shift register.

In the case of functioning as the FIFO type shift register, the write elements (field lines FL) are arranged near one end (first memory area 43-1) of the magnetic body portion 42. In this case, the read element 46 is provided such that the end (first memory area 43-1) at which the write elements (field lines FL) are arranged is magnetically and electrically connected to the end (eighth memory area 43-8) opposite thereto.

Then, the magnetic body portion 42 is supplied with the shift pulse current in a writing/reading direction (direction from the first memory area 43-1 toward the eighth memory area 43-8) from the write element (field line FL) toward the read element 46.

Furthermore, in the above case of functioning as the FIFO type shift register, the magnetic body portion 42 may execute the write processing and the read processing simultaneously. That is, in this case, in the magnetic body portion 42, the simultaneous processing of the reading and writing and the supply of the shift pulse current are alternately executed.

Figure 7:
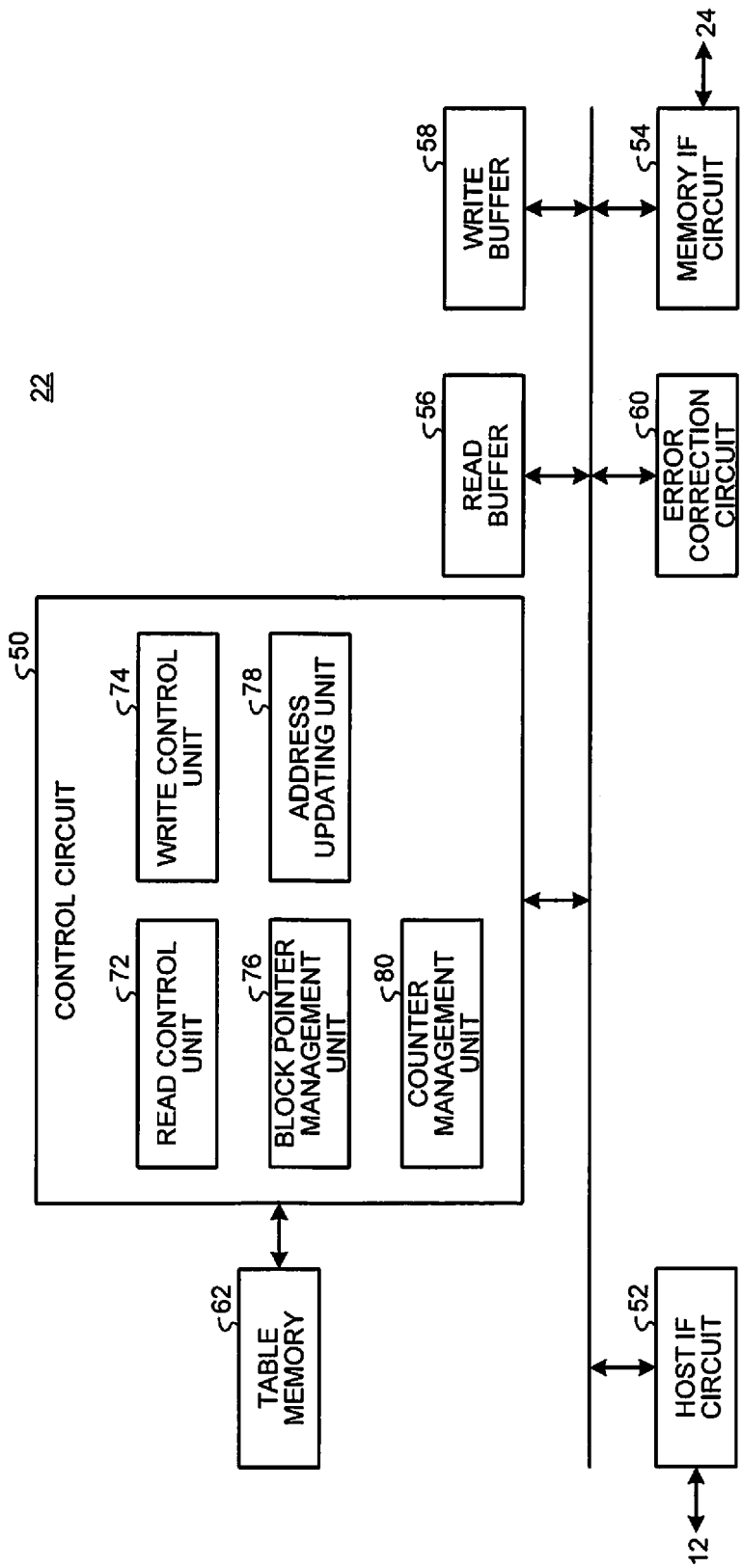
FIG. 7 is a diagram illustrating a configuration of a memory controller according to a first embodiment.

FIG. 7 is a diagram illustrating the configuration of the memory controller 22 according to the first embodiment. The memory controller 22 includes a control circuit 50, a host IF circuit 52, a memory IF circuit 54, a read buffer 56, a write buffer 58, an error correction circuit 60, and a table memory 62.

The control circuit 50 controls transmission and reception of data to and from the host controller 12. In addition, the control circuit 50 controls writing and reading of data in and from the nonvolatile memory 24. The control circuit 50 is, for example, a processing circuit configured to read and execute a computer program stored in a read only memory (ROM) or the like.

The host IF circuit 52 transmits and receives data to and from the host controller 12 over a bus or the like in accordance with control by the control circuit 50. The memory IF circuit 54 transmits and receives data to and from the nonvolatile memory 24 under the control of the control circuit 50.

The read buffer 56 temporarily stores data read from the storage block 40 of the nonvolatile memory 24. The write buffer 58 temporarily stores data before writing the data in the storage block 40 of the nonvolatile memory 24.

The error correction circuit 60 executes error correction processing on the data read from the storage block 40 of the nonvolatile memory 24. In addition, the error correction circuit 60 adds parity for the error correction processing to data to be written in the storage block 40 of the nonvolatile memory 24. Note that the error correction circuit 60 may be implemented by a circuit separate from the control circuit 50, or may be implemented integrally with the control circuit 50. The error correction circuit 60 may be implemented by the control circuit 50 executing a program.

The table memory 62 stores an address conversion table. The correspondence between a logical address and a physical address is registered with the address conversion table for each data stored in each of the plurality of storage blocks 40 included in the nonvolatile memory 24. The logical address is an address assigned by the host controller 12. The physical address is an address assigned to the storage block 40 in which data is stored.

Here, the control circuit 50 functions as a read control unit 72, a write control unit 74, a block pointer management unit 76, an address updating unit 78, and a counter management unit 80 by executing a program stored in a ROM or the like. Thereby, the control circuit 50 operates as a circuit that includes the read control unit 72, the write control unit 74, the block pointer management unit 76, the address updating unit 78, and the counter management unit 80.

The read control unit 72 controls reading of data from the nonvolatile memory 24. The write control unit 74 controls writing of data in the nonvolatile memory 24.

The block pointer management unit 76 manages a block pointer indicating the storage block 40 as a next write destination among the plurality of storage blocks 40 included in the nonvolatile memory 24.

The address updating unit 78 updates the address conversion table when data is written in any of the plurality of storage blocks 40 included in the nonvolatile memory 24. In addition, the address updating unit 78 updates the address conversion table when data written in any of the plurality of storage blocks 40 included in the nonvolatile memory 24 is invalid.

The counter management unit 80 manages a counter value representing the number of times of writing. More specifically, the counter value represents a value equal to or more than the number of times of writing of the storage block 40 in which the most writing is performed, among the plurality of storage blocks 40 included in the nonvolatile memory 24.

Figure 8:
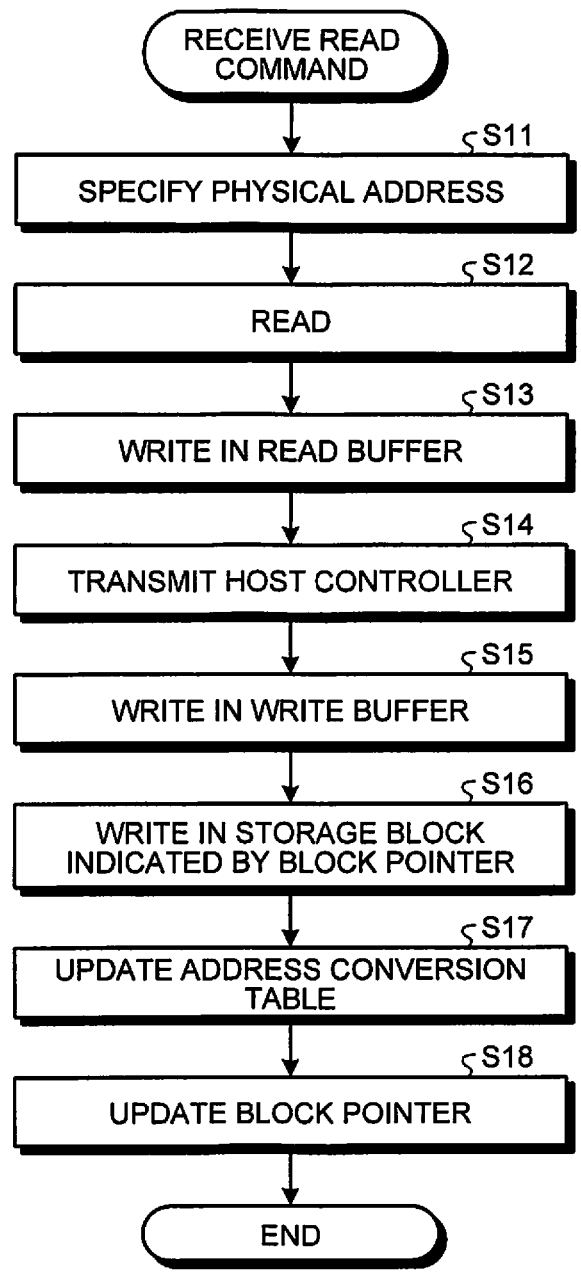
FIG. 8 is a flowchart illustrating a flow of processing by a control circuit when a read command is received.

FIG. 8 is a flowchart illustrating a flow of processing by a control circuit 50 when a read command is received. When a read command is received from the host controller 12, the control circuit 50 executes the processing illustrated in FIG. 8. The read command includes a logical address identifying target data.

First, in S11, the read control unit 72 specifies the physical address of the storage block 40 in which the target data is stored, based on the logical address and the address conversion table. Subsequently, in S12, the read control unit 72 reads the target data from the storage block 40 of the specified physical address.

Subsequently, in S13, the read control unit 72 temporarily stores the read target data in the read buffer 56. At this time, the error correction circuit 60 executes error correction processing on the read target data. Subsequently, in S14, the read control unit 72 transmits the target data temporarily stored in the read buffer 56 to the host controller 12.

Subsequently, in S15, the read control unit 72 temporarily stores the target data stored in the read buffer 56 to the write buffer 58. At this time, the error correction circuit 60 may generate parity again and add the generated parity to the target data.

Subsequently, in S16, the write control unit 74 writes the target data stored in the write buffer 58 in the storage block 40 of the physical address indicated by the block pointer. Subsequently, in S17, the address updating unit 78 changes the physical address of the target data registered with the address conversion table to the physical address of the storage block 40 indicated by the block pointer.

Subsequently, in S18, the block pointer management unit 76 updates the block pointer. The control circuit 50 may execute the processing of S15 to S17 and the processing of S18 in parallel. Note that details of the update processing of the block pointer will be described later with reference to FIG. 10. When the processing of S18 ends, the control circuit 50 ends this flow of processing.

As described above, the read control unit 72 reads the target data from the first storage block of any of the plurality of storage blocks 40 included in the nonvolatile memory 24. In this case, the write control unit 74 writes the target data read from the first storage block in a second storage block different from the first storage block among the plurality of storage blocks 40. Then, the control circuit 50 changes a physical address of the target data registered with the address conversion table to a physical address of the second storage block.

By executing such processing, the storage device 20 does not repeat access to a specific storage block 40 even when specific target data is repeatedly read. Therefore, according to the storage device 20 of the present embodiment, it is capable of leveling the fatigue of the plurality of storage blocks 40 without concentrating the access to the specific storage block 40.

Figure 9:
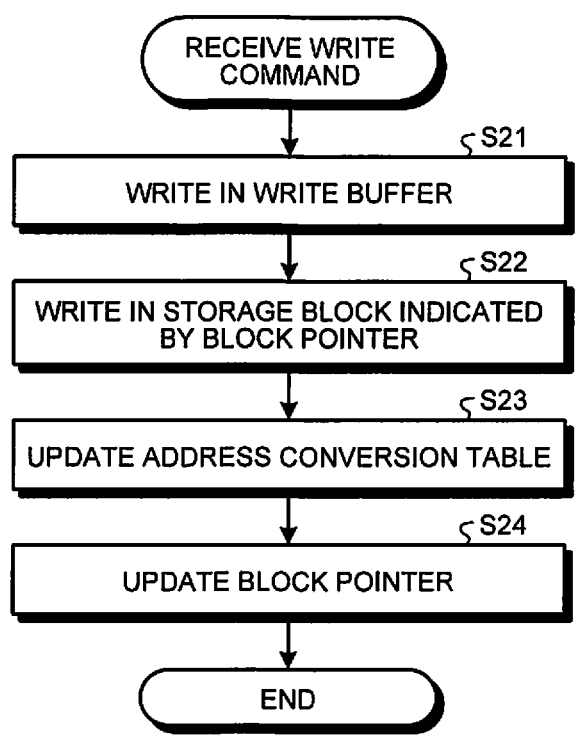
FIG. 9 is a flowchart illustrating a flow of processing by the control circuit when a write command is received.

FIG. 9 is a flowchart illustrating a flow of processing by the control circuit 50 when a write command is received. When the write command is received from the host controller 12, the control circuit 50 executes the processing illustrated in FIG. 9. The write command includes the target data and the logical address for identifying the target data.

First, in S21, the write control unit 74 temporarily stores the target data in the write buffer 58. At this time, the error correction circuit 60 generates parity and adds the generated parity to the target data. Subsequently, in S22, the write control unit 74 writes the target data stored in the write buffer 58 in the storage block 40 indicated by the block pointer.

Subsequently, in S23, the address updating unit 78 changes the physical address of the target data registered in the address conversion table to the physical address of the storage block 40 indicated by the block pointer. When the address updating unit 78 writes new data in the nonvolatile memory 24, a correspondence between the logical address and the physical address of the target data is not yet registered with the address conversion table. The address updating unit 78 newly registers, with the address conversion table, the correspondence between the logical address and the physical address of the target data.

Subsequently, in S24, the block pointer management unit 76 updates the block pointer. The control circuit 50 may execute the processing of S21 to S23 and the processing of S24 in parallel. Note that details of the update processing of the block pointer will be described later with reference to FIG. 10. When the processing of S24 ends, the control circuit 50 ends this flow of processing.

As described above, the write control unit 74 updates the target data stored in the first storage block of any of the plurality of storage blocks 40 included in the nonvolatile memory 24. At this time, the write control unit 74 writes the updated target data in the second storage block different from the first storage block among the plurality of storage blocks 40. Then, the control circuit 50 changes a physical address of the target data registered with the address conversion table to a physical address of the second storage block.

By executing such processing, the storage device 20 does not repeat access to a specific storage block 40 even when specific target data is repeatedly updated. Therefore, according to the storage device 20 of the present embodiment, it is capable of leveling the fatigue of the plurality of storage blocks 40 without concentrating the access to the specific storage block 40.

When the write control unit 74 receives the write command, the write control unit 74 may execute a read-modify-write processing of updating part of data stored in the storage block 40. In this case, first, the write control unit 74 execute processing to: specify a physical address of the storage block 40, in which the target data is stored, based on the logical address and the address conversion table; read the target data from the storage block 40 of the specified physical address; and temporarily stores the read target data in the read buffer 56. Subsequently, the write control unit 74 rewrites part of the data specified by the write command in the read target data. Thereafter, the write control unit 74 executes the processing from S21 to S24 on the rewritten target data. For example, when the size of the data received from the host controller 12 is smaller than the size of the data managed by the storage device 20, the write control unit 74 executes the read-modify-write processing. In the following description, for the sake of simplicity, it is assumed that the write control unit 74 writes data corresponding to each unit of the storage block 40 when a write command is received.

Figure 10:
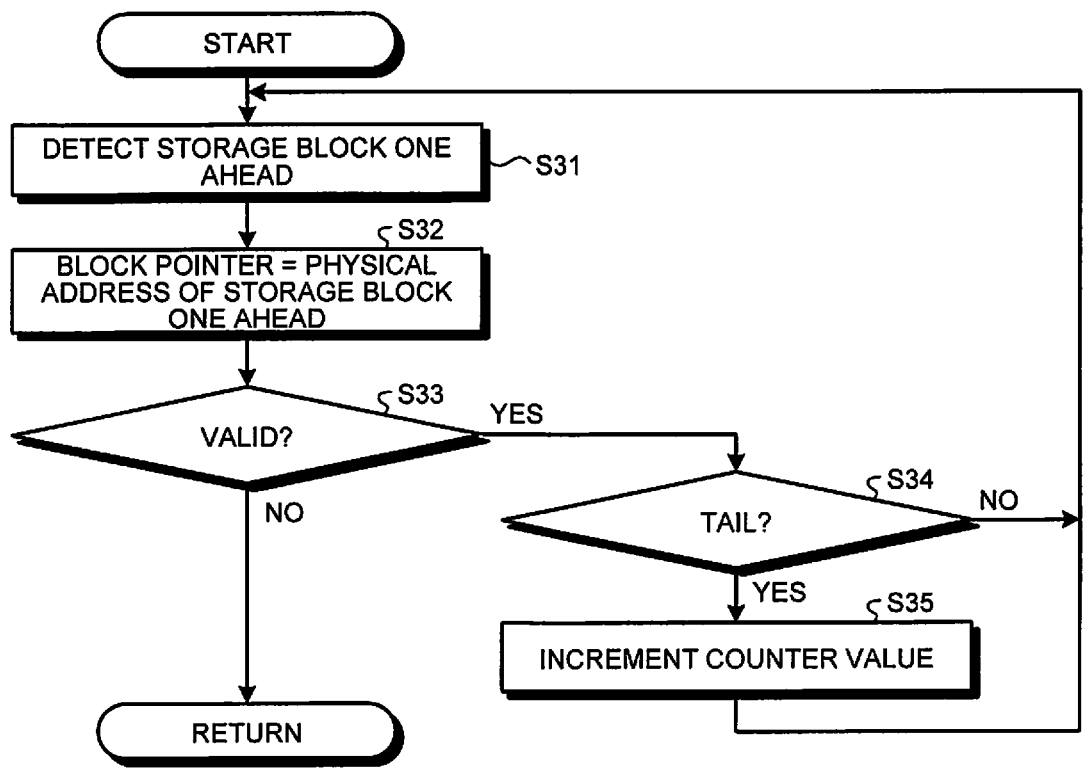
FIG. 10 is a flowchart illustrating a flow of update processing of a block pointer according to the first embodiment.

FIG. 10 is a flowchart illustrating a flow of update processing of a block pointer according to the first embodiment. In S18 of FIG. 8 and S24 of FIG. 9, when the block pointer is updated, the control circuit 50 executes the processing of FIG. 10.

First, in S31, the block pointer management unit 76 cyclically searches the plurality of storage blocks 40 in a predetermined order from a storage block 40 indicated by the block pointer, thereby detecting the storage block 40 one ahead of the storage block 40 indicated by the block pointer. For example, when a physical address of a serial number is assigned to each of the plurality of storage blocks 40, the block pointer management unit 76 detects the storage block 40 one ahead by incrementing or decrementing the block pointer by one. Note that when the block pointer indicates a tail physical address, the block pointer management unit 76 implements a cyclic search by returning the block pointer to a head physical address.

Subsequently, in S32, the block pointer management unit 76 changes the block pointer to indicate the physical address of the detected storage block 40 one ahead.

Subsequently, in S33, the block pointer management unit 76 determines whether or not valid data is stored in the storage block 40 indicated by the block pointer. The block pointer management unit 76 determines that the valid data is not stored when the storage block 40 indicated by the block pointer is an empty block in which data has not yet been written, or is an invalid block in which data was written but is set as being invalid. The block pointer management unit 76 uses, for example, the address conversion table to determine whether or not the valid data is stored in the storage block 40 indicated by the block pointer.

When the valid data is stored in the storage block 40 indicated by the block pointer (Yes in S33), the block pointer management unit 76 progresses the processing to S34. In S34, the block pointer management unit 76 determines whether the storage block 40 indicated by the block pointer is a tail storage block 40. When the storage block 40 is not the tail storage block 40 (No in S34), the block pointer management unit 76 returns the processing to S31, and repeats the processing from S31.

When the storage block is the tail storage block 40 (Yes in S34), the block pointer management unit 76 progresses the processing to S35. In S35, the counter management unit 80 increments the counter value. Accordingly, the counter management unit 80 can update the counter value to indicate a value equal to or greater than the number of times of writing of the storage block 40 in which the most writing is performed, among the plurality of storage blocks 40. After finishing S35, the counter management unit 80 returns the processing to S31 and repeats the processing from S31.

When the valid data is not stored in the storage block 40 indicated by the block pointer (No in S33), the block pointer management unit 76 ends this flow of processing. Accordingly, the block pointer management unit 76 can update the block pointer to indicate a physical address of an initial storage block 40 in which the valid data is not stored, among the plurality of storage blocks 40.

As described above, when the target data is written, the block pointer management unit 76 cyclically searches the plurality of storage blocks 40 in a predetermined order from the storage block 40 indicated by the block pointer, thereby detecting an initial storage block 40, in which the valid data is not stored, among the plurality of storage blocks 40. As a result, the block pointer management unit 76 can sequentially select the storage blocks 40 that do not store the valid data and write the data. Therefore, the storage device 20 can write data in the plurality of storage blocks 40 equally without concentrating the writing in the specific storage block 40.

Further, the counter management unit 80 updates the counter value to become equal to or greater than the number of times of writing of the storage block 40 in which the most writing is performed. As a result, according to the storage device 20, it is capable of managing the life of the nonvolatile memory 24.

Figure 11A:
FIGS. 11A to 11E are diagrams for explaining movement of the block pointer in the first embodiment.
Figure 11B:
Figure 11C:
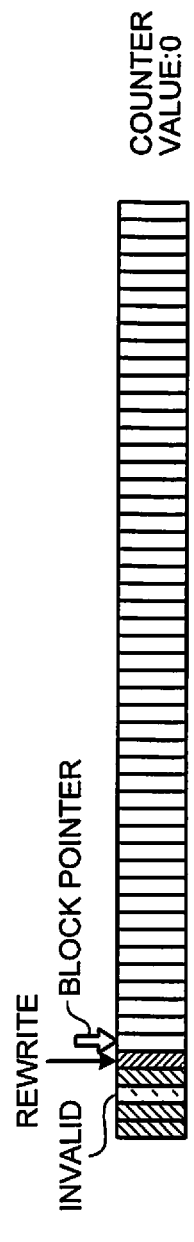
Figure 11D:
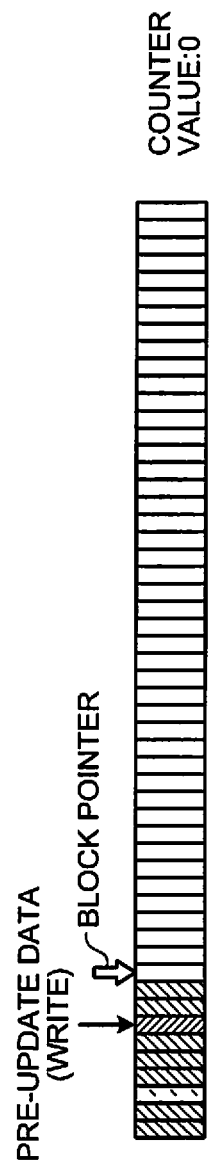
Figure 11E:
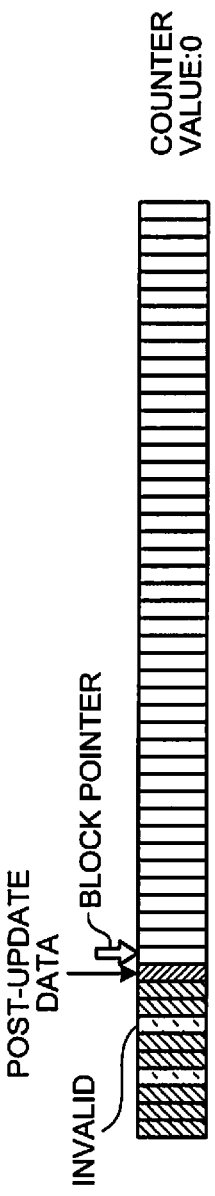

FIGS. 11A to 11E are diagrams for explaining writing, reading, and updating of data in the first embodiment. In FIGS. 11A to 11E, one quadrangle represents one storage block 40. In addition, in FIGS. 11A to 11E, open quadrangles represent empty blocks in which data is not yet written. In addition, in FIGS. 11A to 11E, hatched quadrangles represent the storage blocks 40 after any of data is written. In FIGS. 11A to 11E, different types of hatching patterns may be applied to, for example, data to be focused on, a storage block 40 from which data is read out after written, and a storage block 40 in which invalid data due to updating is written. Subsequent similar figures are the same. FIG. 11B follows FIG. 11A. FIG. 11C follows FIG. 11B. FIG. 11D follows FIG. 11C. FIG. 11E follows FIG. 11D.

new data is written in the storage block 40 indicated by the block pointer. As illustrated in FIG. 11A, After new data is written, the block pointer is updated to indicate an initial storage block 40 in which the valid data is not stored.

As illustrated in FIG. 11B, after data is written, the storage block 40 may read the data by the read command from the host controller 12. As illustrated in FIG. 11C, when data is read from the storage block 40 (as a read source), the read data of this storage block 40 is set as being invalid. The read data is rewritten in the storage block 40 indicated by the block pointer, which is different from the storage block 40 of the read source. After data is rewritten, the block pointer is updated to indicate an initial storage block 40 in which the valid data is not stored.

As illustrated in FIG. 11D, after data is written, the storage block 40 may update the data by the write command from the host controller 12. As illustrated in FIG. 11E, when data is updated, pre-update data stored in the storage block 40 of an updating source is invalid. The post-update data is written in the storage block 40 indicated by the block pointer. After the post-update data is rewritten, the block pointer is updated to indicate an initial storage block 40 in which the valid data is not stored.

FIGS. 12A to 12D are diagrams for explaining movement of the block pointer in the first embodiment. FIG. 12A follows FIG. 11E. FIG. 12B follows FIG. 12A. FIG. 12C follows FIG. 12B. FIG. 12D follows FIG. 12C. The block pointer is changed to indicate a head storage block 40 after reaching the tail storage block 40 among the plurality of storage blocks 40. The counter value is incremented one by one every time the block pointer reaches the tail storage block 40.

After data is written in all the plurality of storage blocks 40 once, the block pointer is updated to indicate an initial storage block 40 in which the valid data is not stored, as illustrated in FIGS. 12A, 12B, and 12C. In addition, as illustrated in FIG. 12D, when the block pointer searches a storage block 40 in which the valid data is not stored, the counter value is incremented every time the block pointer reaches the tail storage block 40.

As described above, the storage device 20 according to the first embodiment does not repeat the access to the specific one storage block 40 even when the reading of the specific target data is repeated or the updating of the specific target data is repeated. Therefore, according to the storage device 20, the storage device 20 is capable of leveling the fatigue of the plurality of storage blocks 40 without concentrating the access to the specific storage block 40.

Second Embodiment

Next, an information processing apparatus 10 according to a second embodiment will be described. The information processing apparatus 10 according to the second embodiment has substantially the same configuration and functions as the information processing apparatus 10 according to the first embodiment. In describing the information processing apparatus 10 according to the second embodiment, components having substantially the same configuration and function as those of the foregoing first embodiment will be denoted by the same reference numerals, and detailed description thereof will be omitted except for differences. Note that the same rules are applied to the third and subsequent embodiments described later.

Figure 13:
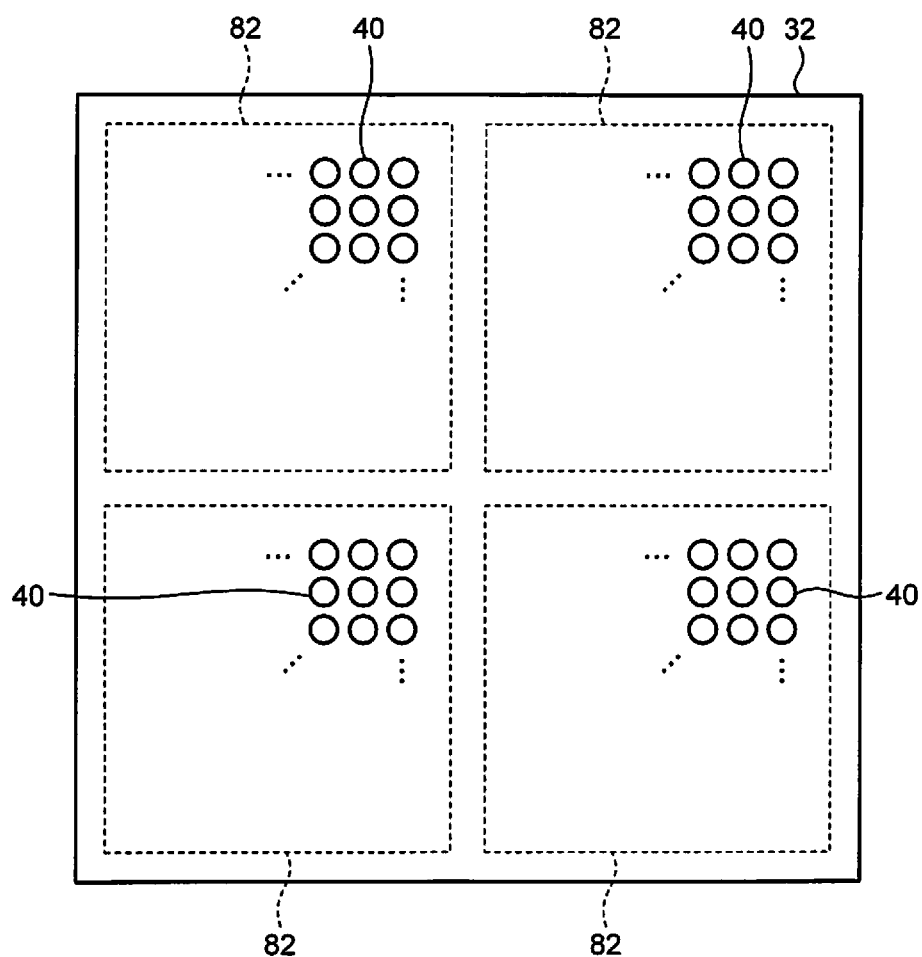
FIG. 13 is a diagram illustrating a memory array according to a second embodiment.

FIG. 13 is a diagram illustrating a memory array 32 according to a second embodiment. In the second embodiment, a nonvolatile memory 24 is segmented into a plurality of areas 82. Each of the plurality of storage blocks 40 is included in any one of the plurality of areas 82. Note that the plurality of areas 82 are not physically segmented in the nonvolatile memory 24, but are logically segmented.

Figure 14:
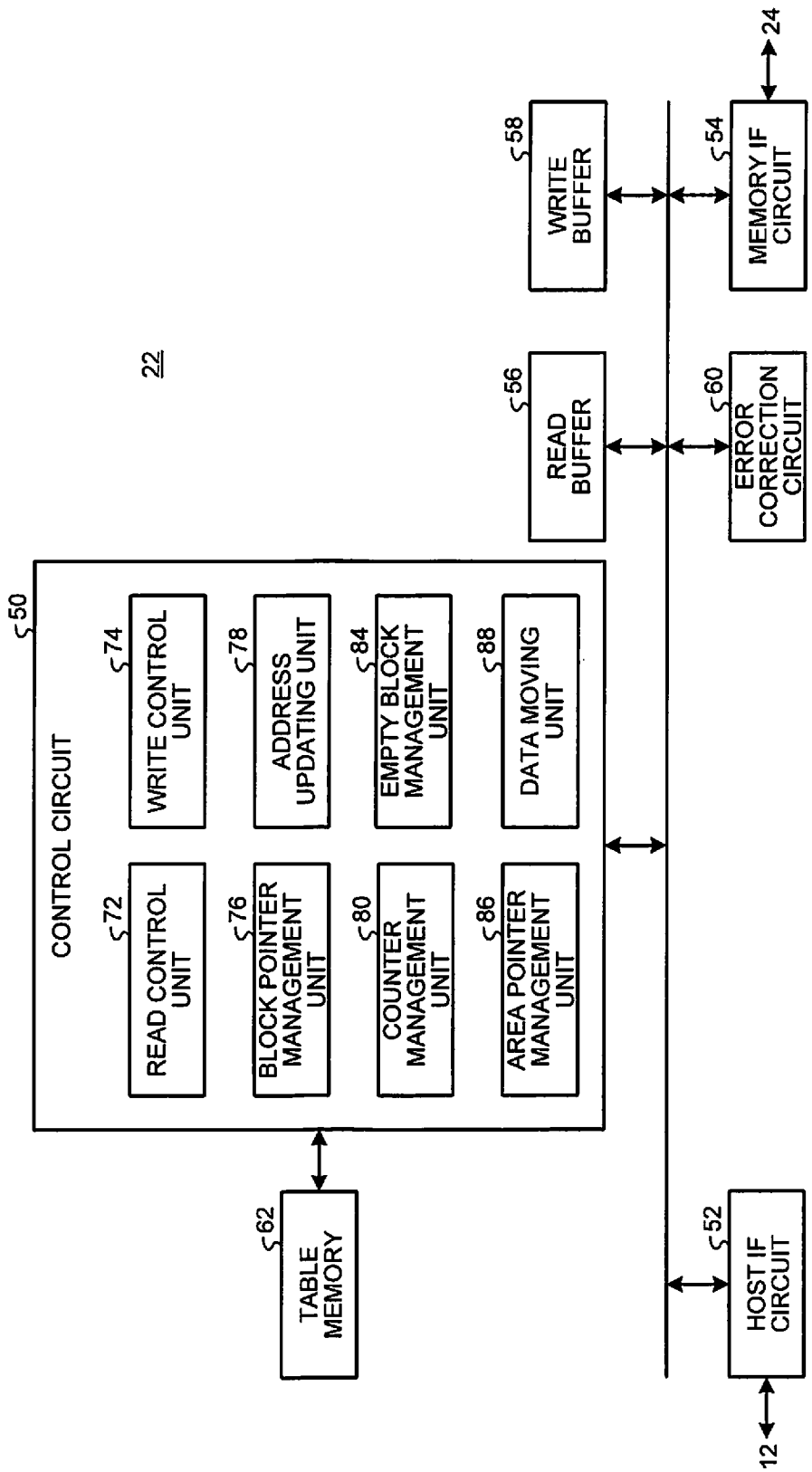
FIG. 14 is a diagram illustrating a configuration of a memory controller according to the second embodiment.

FIG. 14 is a diagram illustrating a configuration of a memory controller 22 according to the second embodiment.

The control circuit 50 according to the second embodiment executes a program stored in a ROM or the like to function as a read control unit 72, a write control unit 74, a block pointer management unit 76, an address updating unit 78, a counter management unit 80, an empty block management unit 84, an area pointer management unit 86, and a data moving unit 88. Thereby, the control circuit 50 operates as a circuit that includes the read control unit 72, the write control unit 74, the block pointer management unit 76, the address updating unit 78, the counter management unit 80, the empty block management unit 84, the area pointer management unit 86, and the data moving unit 88.

The empty block management unit 84 manages, for each of the plurality of areas 82, the number of empty blocks representing the number of storage blocks 40 that do not store valid data. The storage block 40 that does not store the valid data is: an empty block in which data is not yet written; an invalid block in which data was written but is invalidated; or a block in which any data is not written after the written data is read.

The area pointer management unit 86 manages an area pointer indicating a target area as a next write destination among the plurality of areas 82. The area pointer management unit 86 selects, for each of the plurality of areas 82, one area 82 as a new target area based on the number of empty blocks.

In the second embodiment, the write control unit 74 writes a target data in the storage block 40 indicated by a block pointer, in the target area indicated by the area pointer among the plurality of areas 82. In the second embodiment, the counter management unit 80 manages a counter value representing the number of times of writing for each of the plurality of areas 82. More specifically, the counter value represents a value equal to or greater than the number of times of writing of the storage block 40 in which the most writing is performed, among the plurality of storage blocks 40 included in the area 82.

The data moving unit 88 moves a data group stored in the moving source area to a moving destination area when a variance of the counter values of the plurality of areas 82 becomes greater than a predetermined value. The moving source area is any one of the plurality of areas 82 whose counter value is smaller than a predetermined first reference value. The moving destination area is any one of the plurality of areas 82 whose counter value is greater than a predetermined second reference value. Note that the second reference value is greater than the first reference value. As a result, the data moving unit 88 can increase the number of empty blocks in the area 82 whose counter value is smaller than the first reference value.

Figure 15:
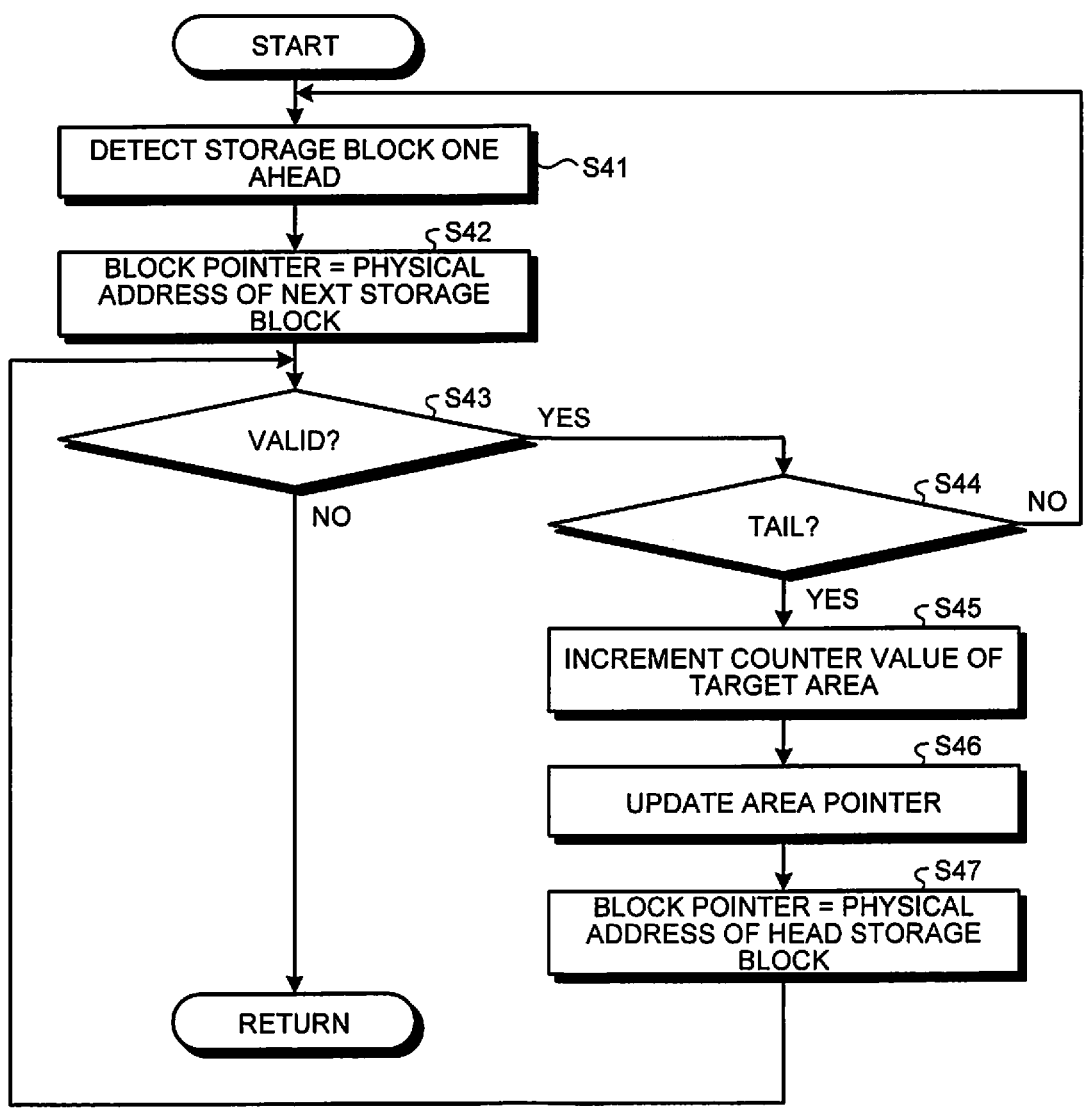
FIG. 15 is a flowchart illustrating a flow of update processing of a block pointer according to the second embodiment.

FIG. 15 is a flowchart illustrating a flow of update processing of a block pointer according to the second embodiment. The control circuit 50 according to the second embodiment executes the processing of FIG. 15 when the block pointer is updated in S18 of FIG. 8 and S24 of FIG. 9.

First, in S41, the block pointer management unit 76 cyclically searches the plurality of storage blocks 40 in a predetermined order from the storage block 40 indicated by the block pointer, thereby detecting the storage block 40 one ahead of the storage block 40 indicated by the block pointer.

Subsequently, in S42, the block pointer management unit 76 changes the block pointer to indicate a physical address of the detected storage block 40 one ahead.

Subsequently, in S43, the block pointer management unit 76 determines whether valid data is stored in the storage block 40 indicated by the block pointer. When the valid data is stored in the storage block 40 indicated by the block pointer (Yes in S43), the block pointer management unit 76 progresses the processing to S44.

In S44, the block pointer management unit 76 determines whether the storage block 40 indicated by the block pointer is a tail storage block 40 in the target area indicated by the area pointer. When the storage block 40 indicated by the block pointer is not the tail storage block 40 (No in S44), the block pointer management unit 76 returns the processing to S41, and repeats the processing from S41.

When the storage block 40 indicated by the block pointer is the tail storage block 40 (Yes in S44), the block pointer management unit 76 progresses the processing to S45. In S45, the counter management unit 80 increments a counter value representing the number of times of writing in the target area. As a result, the counter management unit 80 can update the counter value in the target area to indicate a value equal to or greater than the number of times of writing of the storage block 40 in which the most writing is performed, among two or more storage blocks 40 included in the target area. After S45 is finished, the counter management unit 80 progresses the processing to S46.

Subsequently, in S46, the area pointer management unit 86 selects one of the plurality of areas 82 as a new target area. The area pointer management unit 86 selects one of the plurality of areas 82 as a new target area based on the number of empty blocks for each of the plurality of areas 82 that is managed by the empty block management unit 84. The area pointer management unit 86 updates the area pointer to indicate the selected target area. Details of the update processing of the area pointer will be described later with reference to FIG. 16.

Subsequently, in S47, the block pointer management unit 76 changes the block pointer to indicate a physical address of the head storage block 40 in the target area indicated by the area pointer. When the processing of S47 ends, the block pointer management unit 76 returns the processing to S43, and repeats the processing from S43.

In addition, in S43, when the valid data is not stored in the storage block 40 indicated by the block pointer (No in S43), the block pointer management unit 76 ends this flow of processing.

As described above, when the target data is written, the block pointer management unit 76 searches two or more storage blocks 40 included in the target area among the plurality of storage blocks 40 in a predetermined order from the storage block 40 indicated by the block pointer to the tail storage block 40 in the target area, thereby detecting an initial storage block 40, in which the valid data is not stored, among two or more storage blocks 40 included in the target area. The block pointer management unit 76 updates the block pointer to indicate the detected initial storage block 40. As a result, the block pointer management unit 76 can sequentially select the storage blocks 40 that do not store the valid data in the target area and write the data.

In addition, when the searching reaches the tail storage block 40, the area pointer management unit 86 selects one of the plurality of areas 82 as the target area and updates the area pointer to indicate the selected target area. As a result, the area pointer management unit 86 can select an appropriate target area to write data from among the plurality of areas 82.

In addition, when the searching reaches the tail storage block 40, the block pointer management unit 76 updates the block pointer to indicate the head storage block 40 among the two or more storage blocks 40 included in the new target area, and repeatedly detects an initial storage block 40. As a result, the block pointer management unit 76 can write data from the head storage block 40 of the new target area after searching up to the tail storage block 40.

Figure 16:
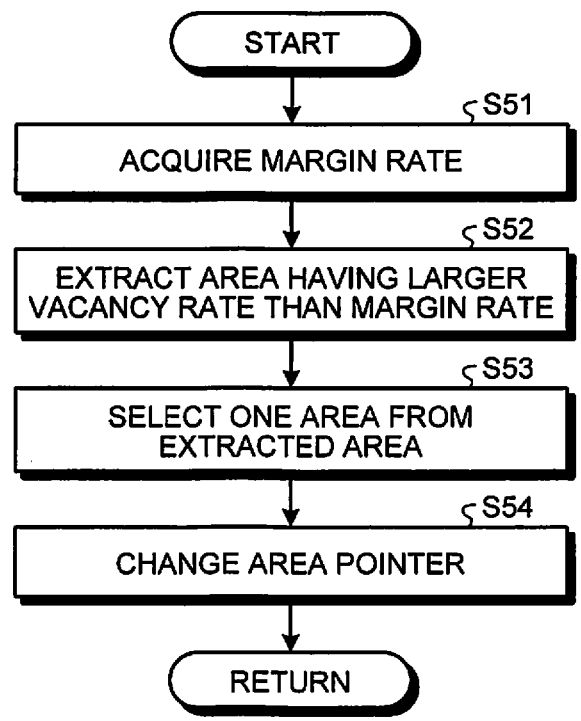
FIG. 16 is a flowchart illustrating a flow of area pointer update processing according to the second embodiment.

FIG. 16 is a flowchart illustrating a flow of area pointer update processing according to the second embodiment. The control circuit 50 executes processing of FIG. 16 when the area pointer is updated in S46 of FIG. 15.

First, in S51, the area pointer management unit 86 acquires a margin rate. The margin rate represents a ratio of the number of empty blocks in the nonvolatile memory 24 to the number of all storage blocks 40 to which data in the nonvolatile memory 24 can be written.

Subsequently, in S52, the area pointer management unit 86 extracts one or more areas 82 having a larger vacancy rate than the margin rate, among the plurality of areas 82. The vacancy rate represents a ratio of the number of empty blocks in the area 82 to the number of storage blocks 40 included in the area 82. The area pointer management unit 86 obtains the number of empty blocks from the empty block management unit 84.

Subsequently, in S53, the area pointer management unit 86 selects one area 82 from one or more areas 82 extracted. The area pointer management unit 86 sets the selected area 82 as a new target area.

Subsequently, in S54, the area pointer management unit 86 changes the area pointer to indicate the selected target area. When S54 is finished, the area pointer management unit 86 ends this flow of processing.

As described above, the area pointer management unit 86 selects, as the target area, the area 82 having the larger vacancy rate than the margin rate, among the plurality of areas 82. As a result, the area pointer management unit 86 can cause the data to be written in the area 82 having a larger vacancy rate than the area 82 having a small vacancy rate.

Instead of the processing of FIG. 16, the area pointer management unit 86 may select, as the target area, the area 82 whose number of empty blocks is equal to or greater than a predetermined value among the plurality of areas 82. Further, the predetermined value may be changed as time elapses. As a result, the area pointer management unit 86 can write data in the area 82 having a large vacancy rate by relatively simple processing.

In addition, the area pointer management unit 86 may select, as the target area, the area 82 having the largest vacancy rate among the plurality of areas 82, instead of the processing of FIG. 16. In addition, the area pointer management unit 86 can write data in order from the area 82 having the largest vacancy rate.

Further, in addition to the above processing, the area pointer management unit 86 may select, as the target area, an area 82 whose counter value is smaller than a predetermined threshold among the plurality of areas 82. Therefore, the area pointer management unit 86 does not select the area 82 whose counter value is equal to or greater than the threshold, even when the area 82 has a large vacancy rate. As a result, the area pointer management unit 86 can level the fatigue of the plurality of areas 82.

Figure 17A:
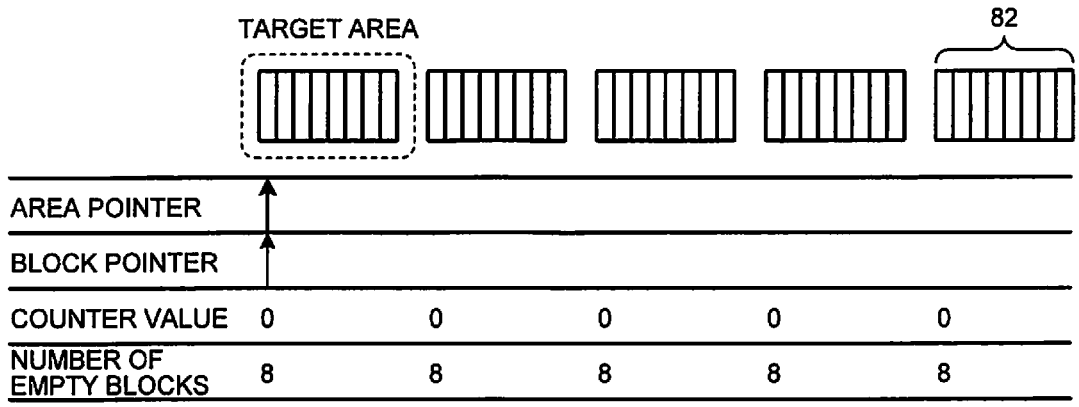
FIGS. 17A to 17C are diagrams illustrating a first example of a state of a plurality of storage blocks according to the second embodiment.
Figure 17B:
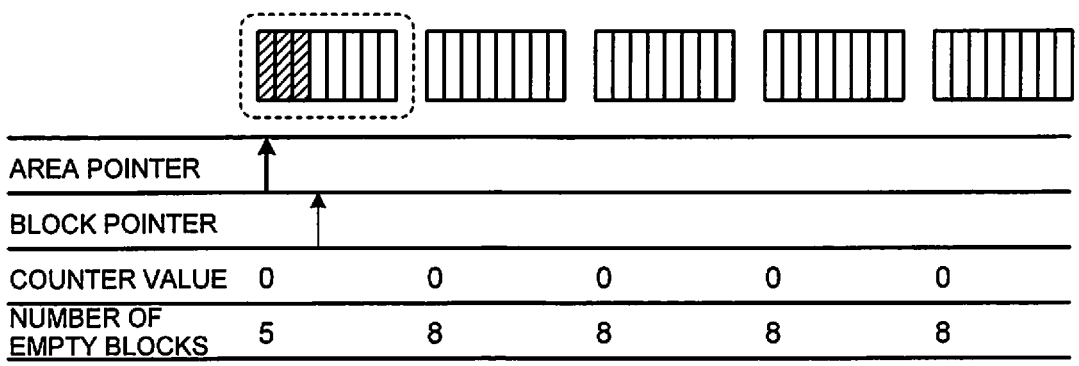
Figure 17C:
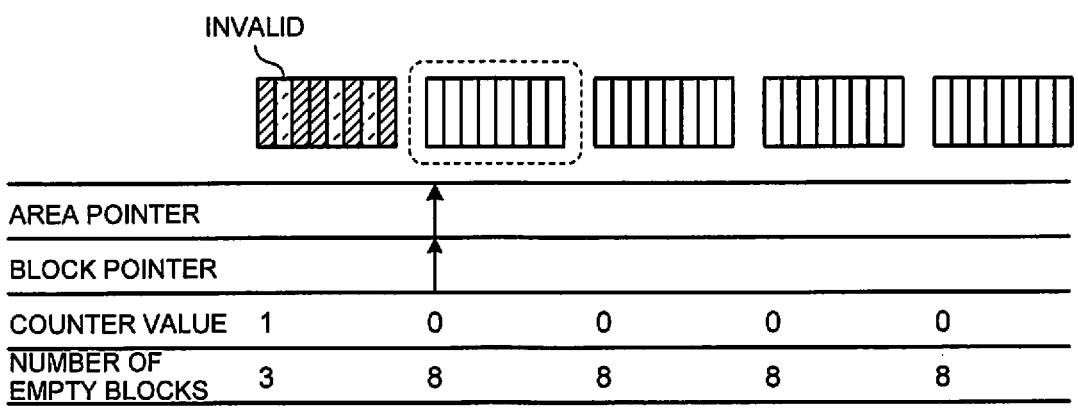

FIGS. 17A to 17C are diagrams illustrating a first example of a state of a plurality of storage blocks 40 according to the second embodiment. FIG. 17B follows FIG. 17A. FIG. 17C follows FIG. 17B. In FIGS. 17A to 17C, the area 82 surrounded by a dotted line represents a target area. The same rule goes for FIGS. 18 and 19 mentioned later.

As illustrated in FIG. 17A, in a state where no data is written in the nonvolatile memory 24, the area pointer indicates a target area selected based on a predetermined reference. In addition, the block pointer indicates the head storage block 40 in the target area.

As illustrated in FIG. 17B, data are sequentially written in the target area from the head storage block 40. The number of empty blocks in the target area is decremented every time data is written.

As illustrated in FIG. 17C, when data is written up to the tail storage block 40 in the target area, the area pointer is updated to indicate the selected new target area. In addition, the number of empty blocks in each of the plurality of areas 82 is incremented every time data is read from the area 82 and every time data stored in the area 82 is invalidated. In addition, the number of empty blocks in each of the plurality of areas 82 is decremented every time data is written in the area 82.

Figure 18A:
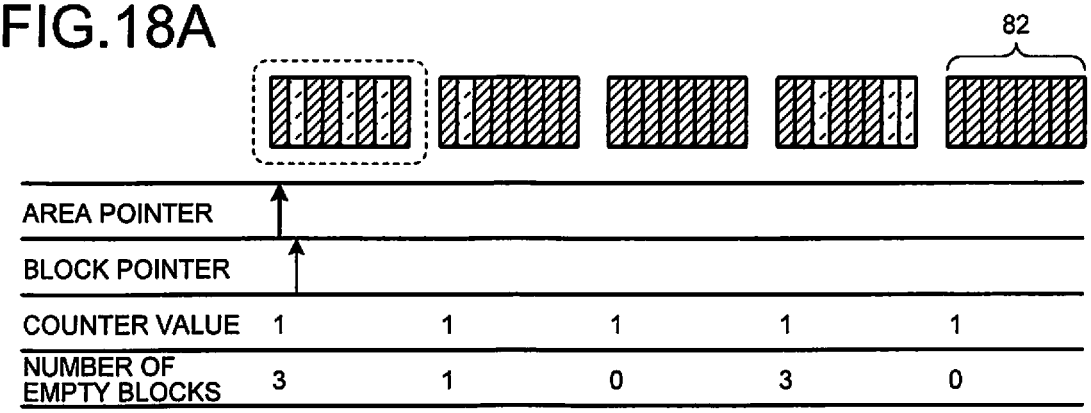
FIGS. 18A to 18C are diagrams illustrating a second example of a state of a plurality of storage blocks according to the second embodiment.
Figure 18B:
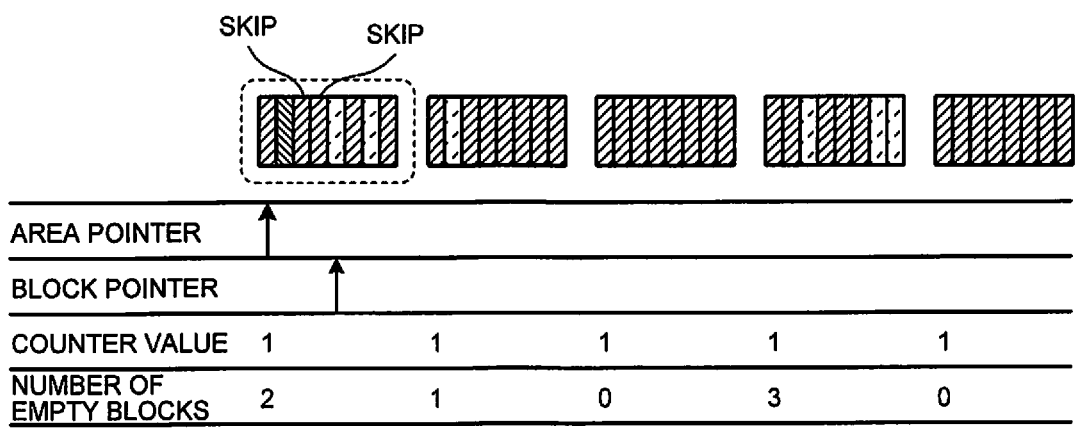
Figure 18C:
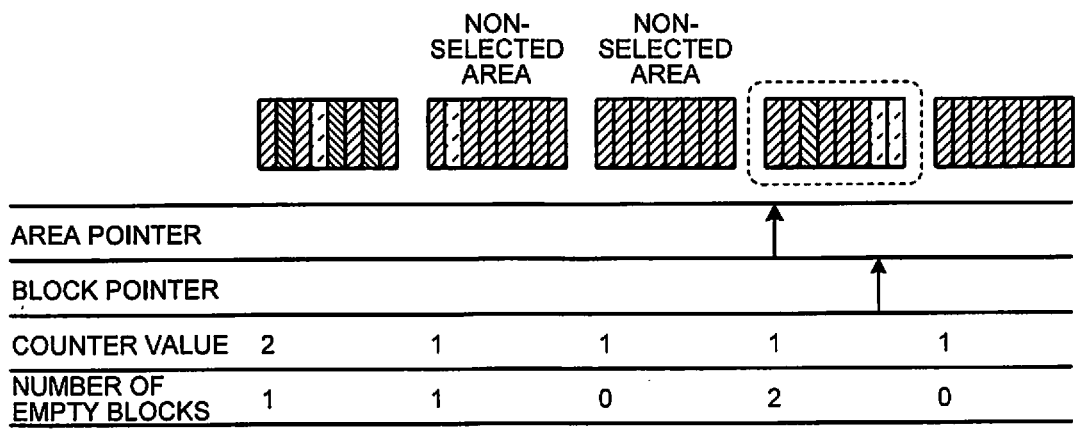

FIGS. 18A to 18C are diagrams illustrating a second example of the state of the plurality of storage blocks 40 according to the second embodiment. FIG. 18B follows FIG. 18A. FIG. 18C follows FIG. 18B. As illustrated in FIG. 18A, the target area is selected from, for example, one or more areas 82 whose number of empty blocks is equal to or greater than a predetermined value.

As illustrated in FIG. 18B, when the area 82 in which data is written one or more times is selected as the target area, the block pointer is updated to indicate an initial invalid storage block 40 in the target area. The initial invalid storage block 40 is an invalid storage block 40 that is initially detected when the plurality of storage blocks 40 in the target area are searched in a predetermined order from the position of the immediately preceding block pointer. Therefore, the valid storage block 40 in the target area is skipped in the search.

As illustrated in FIG. 18C, the target area is selected from one or more areas 82 whose number of empty blocks is equal to or greater than the predetermined value, so that the area 82 whose number of empty blocks is smaller than the predetermined value is not selected as the target area. For example, the area 82 whose number of empty blocks is smaller than 1 is not selected as the target area.

Figure 19A:
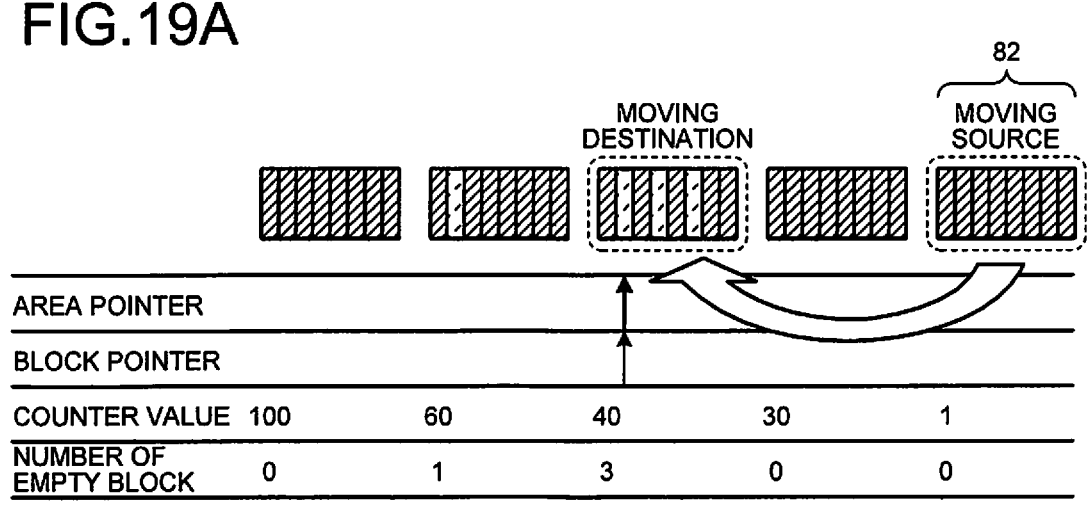
FIGS. 19A to 19B are diagrams for explaining movement of a data group according to the second embodiment.
Figure 19B:
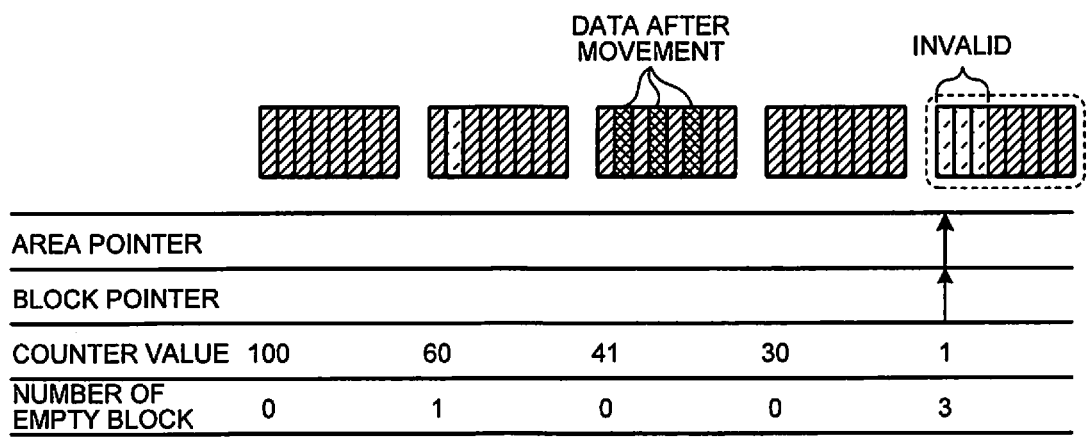

FIGS. 19A to 19B are diagrams for explaining movement of a data group according to the second embodiment. FIG. 19B follows FIG. 19A. The data moving unit 88 executes a data group moving processing when the variance of the counter values of the plurality of areas 82 becomes greater than a predetermined value. For example, the data moving unit 88 may determine that the variance of the counter value is greater than a predetermined value when a difference between a maximum value and a minimum value of the counter value is equal to or greater than the predetermined value.

When executing the moving processing, the data moving unit 88 specifies, as the moving source area, any one of the plurality of areas 82 whose counter value is smaller than a predetermined first reference value. In addition, when executing the moving processing, the data moving unit 88 specifies, as the moving destination area, any one of the plurality of areas 82 whose counter value is larger than a predetermined second reference value. Further, the data moving unit 88 may specify, as the moving destination area, any area 82 whose number of empty blocks is equal to or greater than a predetermined value and whose counter value is greater than the second reference value.

Specifically, as illustrated in FIG. 19A, the data moving unit 88 specifies, as the moving source area, the area 82 whose counter value is 1. Further, the data moving unit 88 specifies, as the moving destination area, the area 82 whose counter value is 40 and whose number of empty blocks is 3.

Then, as illustrated in FIG. 19B, the data moving unit 88 moves the data group stored in the moving source area to the moving destination area. More specifically, the data moving unit 88 reads a data group stored in the storage blocks 40 having the number equal to or smaller than the number of empty blocks in the moving destination area in the moving source area. Subsequently, the data moving unit 88 writes the read data group in the empty block in the moving destination area. As a result, the data moving unit 88 can increase the number of empty blocks in the moving source area.

As described above, the storage device 20 according to the second embodiment can write data in the area 82 having a large number of vacancies among the plurality of areas 82. As a result, the storage device 20 according to the second embodiment can efficiently write data in the area 82 having a large number of vacancies.

Third Embodiment

Next, an information processing apparatus 10 according to a third embodiment will be described.

Figure 20:
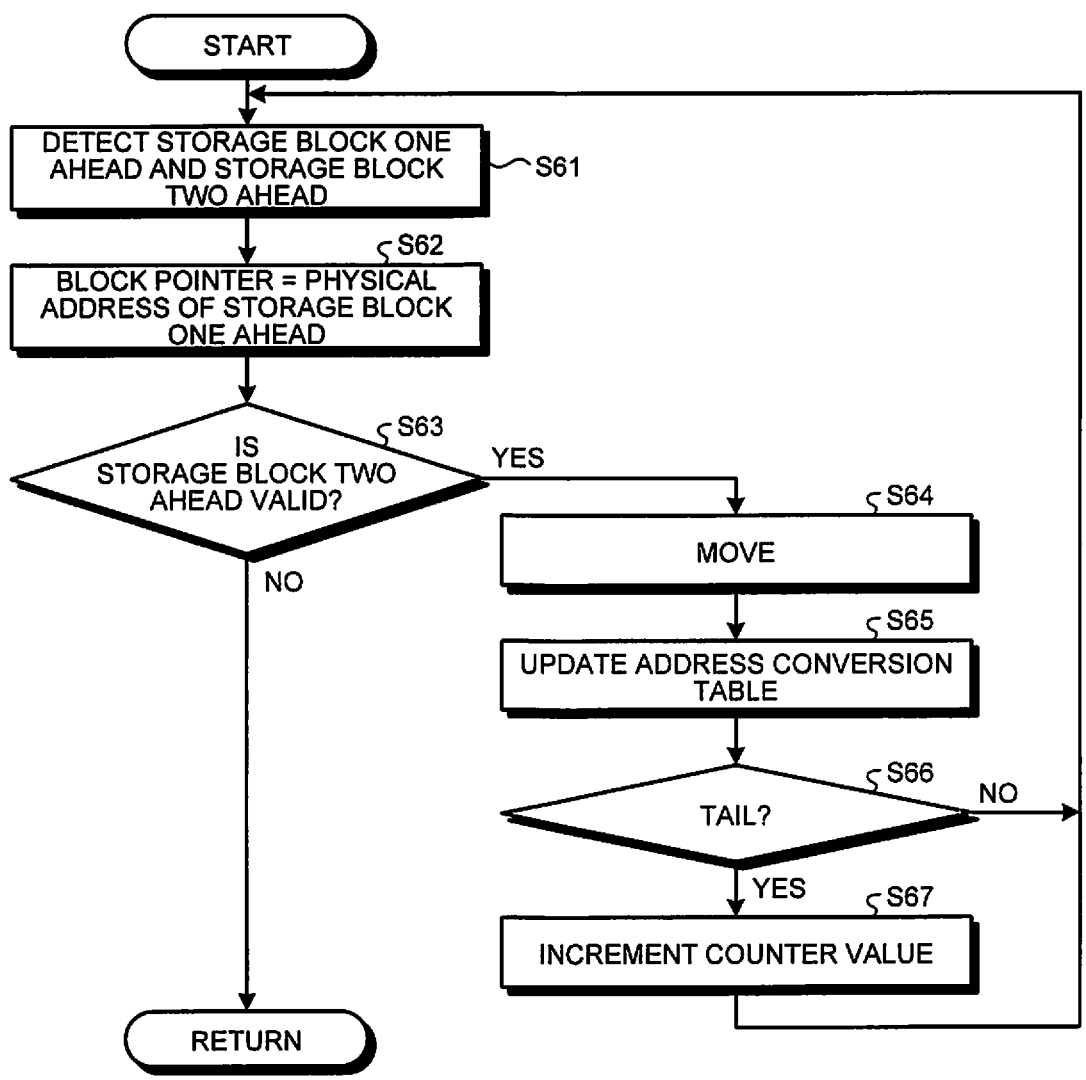
FIG. 20 is a flowchart illustrating a flow of update processing of a block pointer according to a third embodiment.

FIG. 20 is a flowchart illustrating a flow of update processing of a block pointer according to a third embodiment. A control circuit 50 according to the third embodiment is different from the control circuit 50 according to the first embodiment in terms of update processing of a block pointer.

The control circuit 50 according to the third embodiment executes the update processing of FIG. 20 for that in S18 of FIG. 8 and S24 of FIG. 9.

First, in S61, a block pointer management unit 76 cyclically searches a plurality of storage blocks 40 in a predetermined order from a storage block 40 indicated by the block pointer, thereby detecting a storage block 40 one ahead of the storage block 40 and a storage block 40 two ahead of the storage block 40 indicated by the block pointer among the plurality of storage blocks 40. Subsequently, in S62, the block pointer management unit 76 changes the block pointer to indicate a physical address of the storage block 40 one ahead.

Subsequently, in S63, the block pointer management unit 76 determines whether valid data is stored in the storage block 40 two ahead. When valid data is stored in the storage block 40 two ahead (Yes in S63), the block pointer management unit 76 progresses the processing to S64.

In S64, the block pointer management unit 76 moves data stored in the storage block 40 two ahead to the storage block 40 one ahead. More specifically, the block pointer management unit 76 reads the data from the storage block 40 two ahead. Subsequently, the block pointer management unit 76 writes the read data in the storage block 40 one ahead.

Subsequently, in S65, an address updating unit 78 updates the physical address of the data, which is registered with an address conversion table and is moved from the storage block 40 two ahead to the storage block 40 one ahead.

Subsequently, in S66, the block pointer management unit 76 determines whether the storage block 40 indicated by the block pointer is a tail storage block 40. When the storage block 40 is not the tail storage block 40 (No in S66), the block pointer management unit 76 returns the processing to S61 and repeats the processing from S61.

When the storage block is the tail storage block 40 (Yes in S66), the block pointer management unit 76 progresses the processing to S67. In S67, a counter management unit 80 increments a counter value. After S67 is finished, the counter management unit 80 returns the processing to S61 and repeats the processing from S61.

In addition, when the valid data is not stored in the storage block 40 two ahead (No in S63), the block pointer management unit 76 ends this flow of processing. As a result, the block pointer management unit 76 can update the block pointer to indicate the physical address of an initial storage block 40 of the two consecutive storage blocks 40 in which the valid data is not stored.

As described above, when target data is written, the block pointer management unit 76 cyclically searches the plurality of storage blocks 40 in a predetermined order from the storage block 40 indicated by the block pointer, thereby detecting the storage block 40 one ahead of the storage block 40 and the storage block 40 two ahead of the storage block 40 indicated by the block pointer among the plurality of storage blocks 40. In addition, the block pointer management unit 76 updates the block pointer to indicate the storage block 40 one ahead. In addition, when the valid data is stored in the storage block 40 two ahead, the block pointer management unit 76 moves the data stored in the storage block 40 two ahead to the storage block 40 one ahead. The block pointer management unit 76 repeats the detection of the storage block 40 one ahead and the storage block 40 two ahead, the updating of the block pointer, and the movement of the data until detecting the second storage block 40 two ahead in which the valid data is not stored. As a result, the block pointer management unit 76 can equalize the number of times of writing in each of the plurality of storage blocks 40.

Figure 21A:
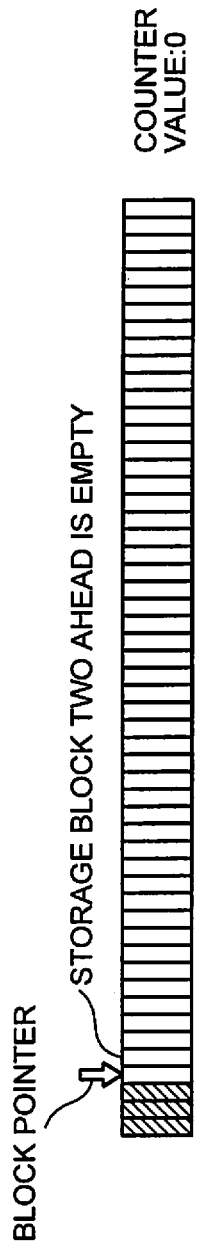
FIGS. 21A to 21D are diagrams for explaining writing, reading, and updating of data in the third embodiment.
Figure 21B:
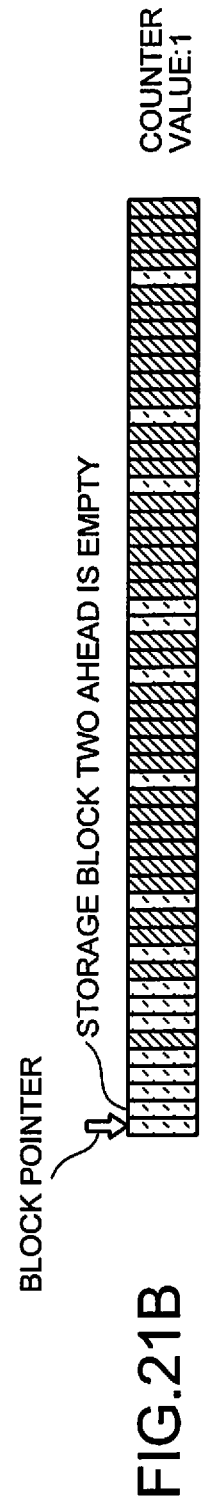
Figure 21C:
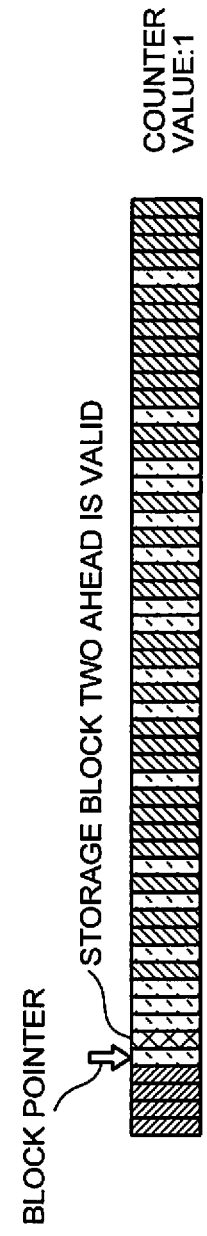
Figure 21D:
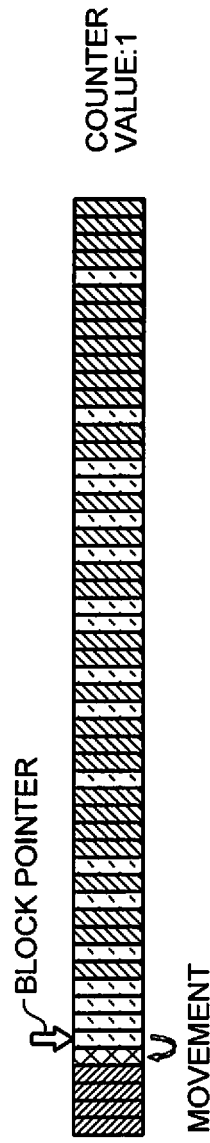

FIG. 21A to 21D are diagrams for explaining writing, reading, and updating of data in the third embodiment. FIG. 21B follows FIG. 21A. FIG. 21C follows FIG. 21B. FIG. 21D follows FIG. 21C.

For example, as illustrated in FIG. 21A, when the storage block 40 two ahead is an empty block, the block pointer is updated to indicate the storage block 40 one ahead that is an empty block. In addition, for example, as illustrated in FIG. 21B, when the storage block 40 two ahead is an invalid block, the block pointer is updated to indicate the storage block 40 one ahead that is the invalid block.

Here, as illustrated in FIG. 21C, the valid data may be stored in the storage block 40 two ahead of the storage block 40 in which data is written. In this case, as illustrated in FIG. 21D, the data stored in the storage block 40 two ahead is moved to the storage block 40 one ahead. As a result, the storage block 40 two ahead becomes an invalid block, and the block pointer is updated to indicate the storage block 40 two ahead.

As described above, the storage device 20 according to the third embodiment cyclically searches the plurality of storage blocks 40 in a predetermined order, and, when the storage block 40 in which data is not read once is detected after data is written, the data is read from the storage block 40 and written in the preceding storage block. As a result, the storage device 20 according to the third embodiment can equalize the number of times of writing in each of the plurality of storage blocks 40.

Fourth Embodiment

Next, an information processing apparatus 10 according to a fourth embodiment will be described.

Figure 22:
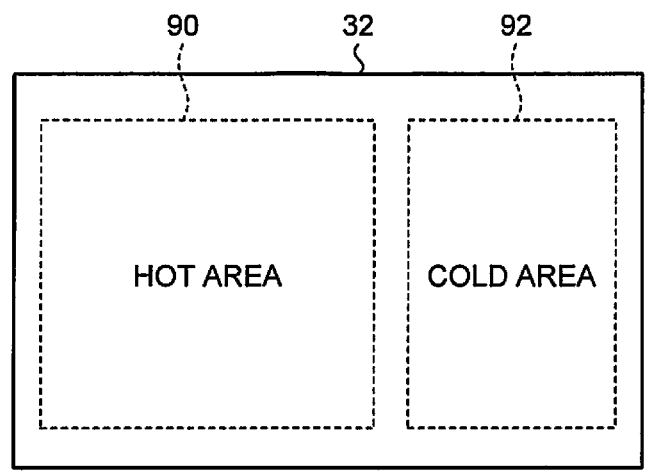
FIG. 22 is a diagram illustrating a memory array according to a fourth embodiment.

FIG. 22 is a diagram illustrating a memory array 32 according to the fourth embodiment. In the fourth embodiment, a nonvolatile memory 24 includes a hot area 90 and a cold area 92. Each of the plurality of areas 82 is included any one of the hot area 90 or the cold area 92. The hot area 90 and the cold area 92 are not physically segmented in the nonvolatile memory 24, but are logically segmented.

Figure 23:
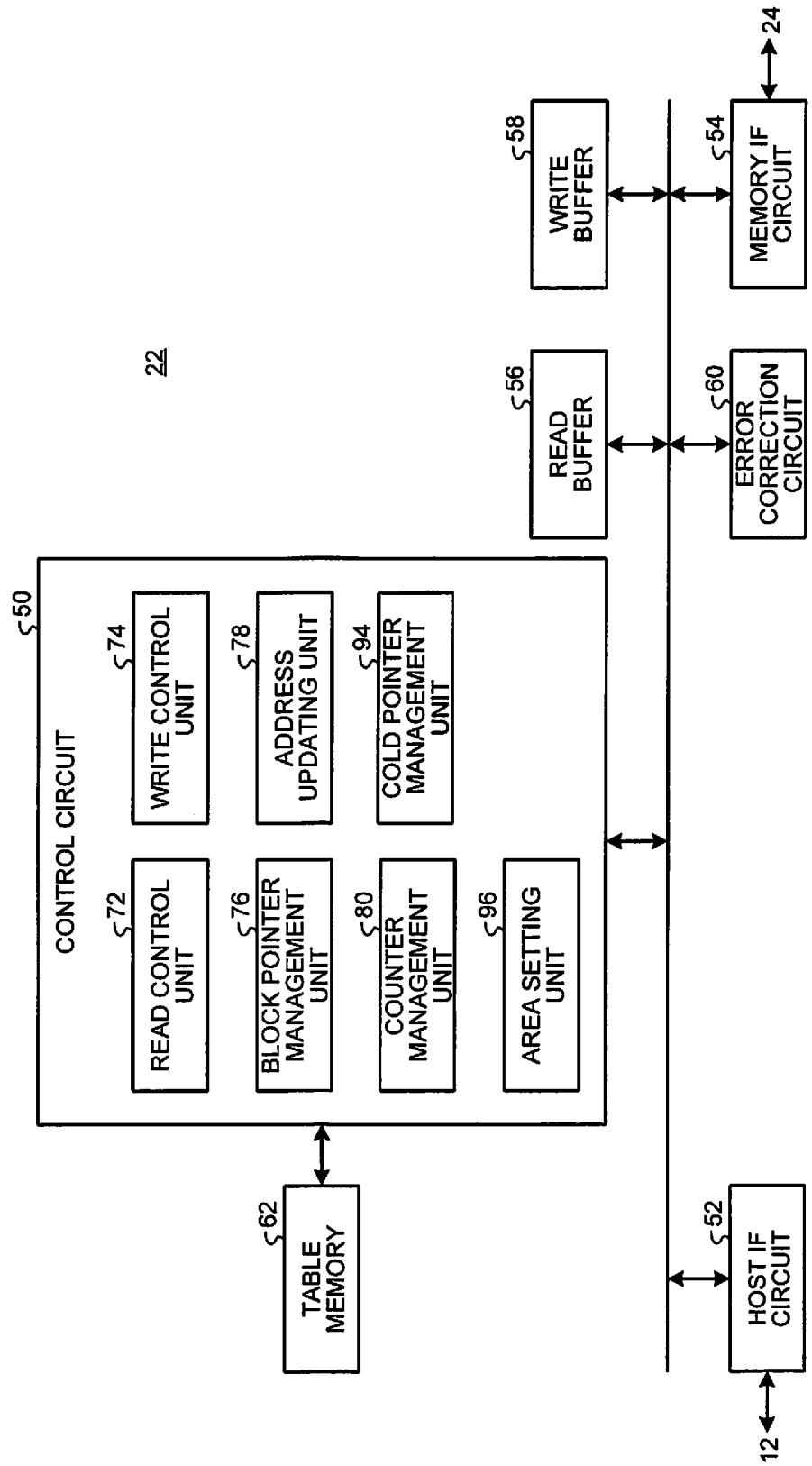
FIG. 23 is a diagram illustrating a configuration of a memory controller according to the fourth embodiment.

FIG. 23 is a diagram illustrating a configuration of a memory controller 22 according to the fourth embodiment. A control circuit 50 according to the fourth embodiment executes a program stored in a ROM or the like to function as a read control unit 72, a write control unit 74, a block pointer management unit 76, an address updating unit 78, a counter management unit 80, a cold pointer management unit 94, and an area setting unit 96. As a result, the control circuit 50 operates as a circuit that includes the read control unit 72, the write control unit 74, the block pointer management unit 76, the address updating unit 78, the counter management unit 80, the cold pointer management unit 94, and the area setting unit 96.

In the fourth embodiment, a block pointer indicates a storage block 40 that is a next write destination among two or more storage blocks 40 included in the hot area 90. The cold pointer management unit 94 manages a cold pointer. The cold pointer indicates a storage block 40 that is a next write destination among two or more storage blocks 40 included in the cold area 92.

The area setting unit 96 allocates the hot area 90 or the cold area 92 to each of the plurality of storage blocks 40. The area setting unit 96 changes, between the hot area 90 and the cold area 92, the allocation of an area to each of the plurality of storage blocks 40 at a predetermined timing. In addition, in the fourth embodiment, the counter management unit 80 manages a counter value of the hot area 90 and a counter value of the cold area 92.

Figure 24:
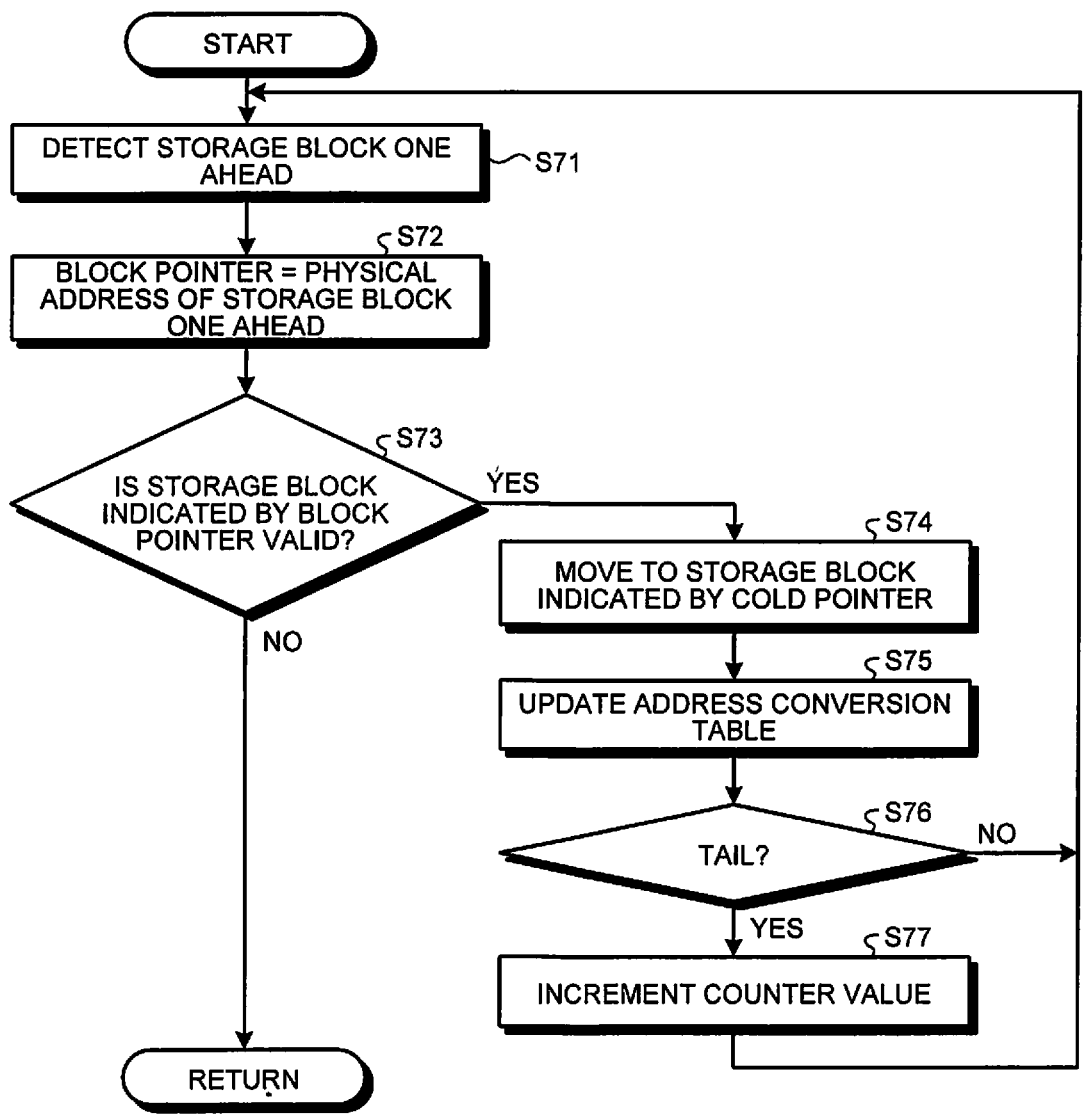
FIG. 24 is a flowchart illustrating a flow of update processing of a block pointer according to the fourth embodiment.

FIG. 24 is a flowchart illustrating a flow of update processing of a block pointer according to the fourth embodiment. The control circuit 50 according to the fourth embodiment executes the update processing of FIG. 24 for that in S18 of FIG. 8 and S24 of FIG. 9.

First, in S71, the block pointer management unit 76 cyclically searches two or more storage blocks 40 included in the hot area 90 in a predetermined order from the storage block 40 indicated by the block pointer, thereby detecting a storage block 40 one ahead of the storage block 40 indicated by the block pointer.

Subsequently, in S72, the block pointer management unit 76 changes the block pointer to indicate a physical address of the storage block 40 one ahead in the hot area 90.

Subsequently, in S73, the block pointer management unit 76 determines whether valid data is stored in the storage block 40 one ahead in the hot area 90. When valid data is stored in the storage block 40 one ahead in the hot area 90 (Yes in S73), the block pointer management unit 76 progresses the processing to S74.

In S74, the block pointer management unit 76 moves data stored in the storage block 40 one ahead in the hot area 90 to the storage block 40 indicated by the cold pointer. More specifically, the block pointer management unit 76 reads the data from the storage block 40 one ahead in the hot area 90. Subsequently, the block pointer management unit 76 writes the read data in the storage block 40 indicated by the cold pointer.

Subsequently, in S75, the address updating unit 78 updates the physical address of the data, which is registered with an address conversion table and moved from the storage block 40 one ahead in the hot area 90 to the storage block 40 indicated by the cold pointer.

Subsequently, in S76, the block pointer management unit 76 determines whether the storage block 40 indicated by the block pointer is a tail storage block 40. When the storage block 40 is not the tail storage block 40 (No in S76), the block pointer management unit 76 returns the processing to S71, and repeats the processing from S71.

When the storage block is the tail storage block 40 (Yes in S76), the block pointer management unit 76 progresses the processing to S77. In S77, the counter management unit 80 increments the counter value of the hot area 90. After S77 is finished, the counter management unit 80 returns the processing to S71 and repeats the processing from S71.

In addition, when the valid data is not stored in the storage block 40 one ahead in the hot area 90 (No in S73), the block pointer management unit 76 ends this flow of processing. As a result, after data is written, when the storage block 40 in which the data is not read even once is detected in the hot area 90, the block pointer management unit 76 can move the data of the storage block 40 to the cold area 92.

As described above, the block pointer management unit 76 cyclically searches two or more storage blocks 40 included in the hot area 90 in a predetermined order from the storage block 40 indicated by the block pointer when target data is written, thereby detecting the storage block 40 one ahead of the storage block 40 indicated by the block pointer among the two or more storage blocks 40 included in the hot area 90. In addition, the block pointer management unit 76 updates the block pointer to indicate the storage block 40 one ahead in the hot area 90. In addition, when the valid data is stored in the storage block 40 one ahead in the hot area 90, the block pointer management unit 76 moves the data stored in the storage block 40 one ahead in the hot area 90 to the storage block 40 indicated by the cold pointer. The block pointer management unit 76 repeats the detection of the storage block 40 one ahead, the updating of the block pointer, and the movement of the data until detecting, within the hot area 90, the storage block 40 one ahead in which the valid data is not stored.

As a result, the storage device 20 can equalize the number of times of writing in each of the two or more storage blocks 40 included in the hot area 90. Further, the storage device 20 can store data with a low access frequency in each of the two or more storage blocks 40 included in the cold area 92.

Further, when the data stored in the storage block 40 included in the hot area 90 is moved to the storage block 40 indicated by the cold pointer, the cold pointer management unit 94 executes the processing illustrated in FIG. 10. In this case, the cold pointer management unit 94 executes the processing using the cold pointer instead of the block pointer. In addition, the counter management unit 80 increments the counter value of the cold area 92.

Thus, the cold pointer management unit 94 performs a cyclic search in a predetermined order from the storage block 40 indicated by the cold pointer, thereby detecting an initial storage block 40, in which the valid data is not stored, among the two or more storage blocks 40 included in the cold area 92. Then, the cold pointer management unit 94 changes the cold pointer to indicate the initial storage block 40 in which the valid data is not stored among the two or more storage blocks 40 included in the cold area 92. As a result, the storage device 20 can perform writing equally without concentrating the writing in a specific storage block 40 among the two or more storage blocks 40 included in the cold area 92.

The cold pointer management unit 94 may execute the processing illustrated in FIG. 20 when the data stored in the storage block 40 included in the hot area 90 is moved to the storage block 40 indicated by the cold pointer. In this case, the cold pointer management unit 94 executes the processing using the cold pointer instead of the block pointer. In addition, the counter management unit 80 increments the counter value of the cold area 92. As a result, the storage device 20 can equalize the number of times of writing in each of the two or more storage blocks 40 included in the cold area 92.

Figure 25:
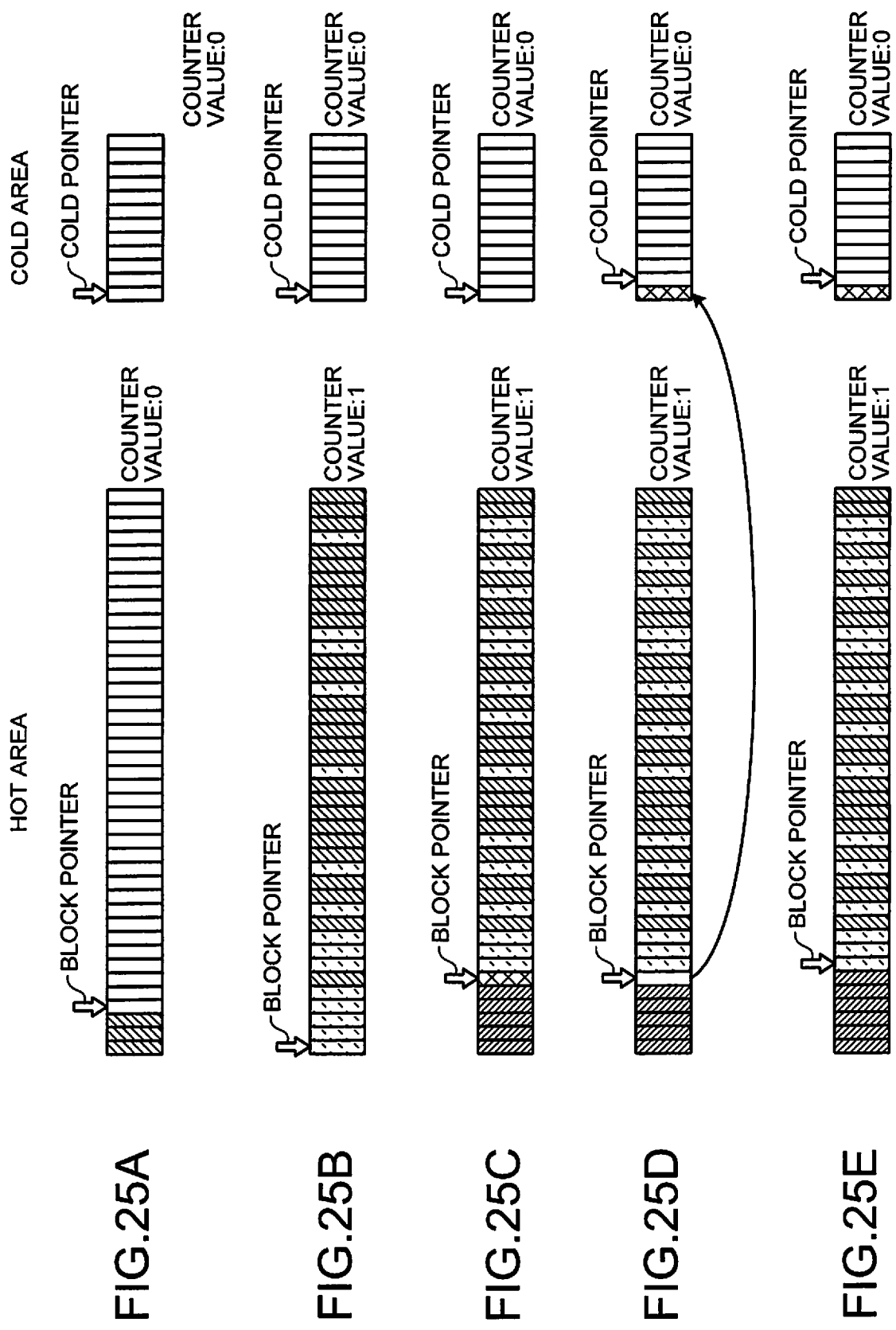
FIGS. 25A to 25E are diagrams for explaining writing, reading, and updating of data in the fourth embodiment.

FIG. 25A to 25E are diagrams for explaining writing, reading, and updating of data in the fourth embodiment. FIG. 25B follows FIG. 25A. FIG. 25C follows FIG. 25B. FIG. 25D follows FIG. 25C. FIG. 25E follows FIG. 25D.

For example, as illustrated in FIG. 25A, when the storage block 40 one ahead of the storage block 40, in which the data is written, in the hot area 90 is an empty block, the block pointer is updated to indicate the storage block 40 one ahead that is the empty block. In addition, for example, as illustrated in FIG. 25B, when the storage block 40 one ahead of the storage block 40, in which the data is written, in the hot area 90 is an invalid block, the block pointer is updated to indicate the storage block 40 one ahead that is the invalid block.

Here, as illustrated in FIG. 25C, the valid data may be stored in the storage block 40 one ahead of the storage block 40, in which data is written, in the hot area 90. In this case, as illustrated in FIG. 25D, the data stored in the storage block 40 one ahead in the hot area 90 is moved to the storage block 40 indicated by the cold pointer. Then, as illustrated in FIG. 25E, new data is written in the storage block 40 that becomes empty due to the move of the data to the cold area 92, and the block pointer is moved one ahead.

Figure 26:
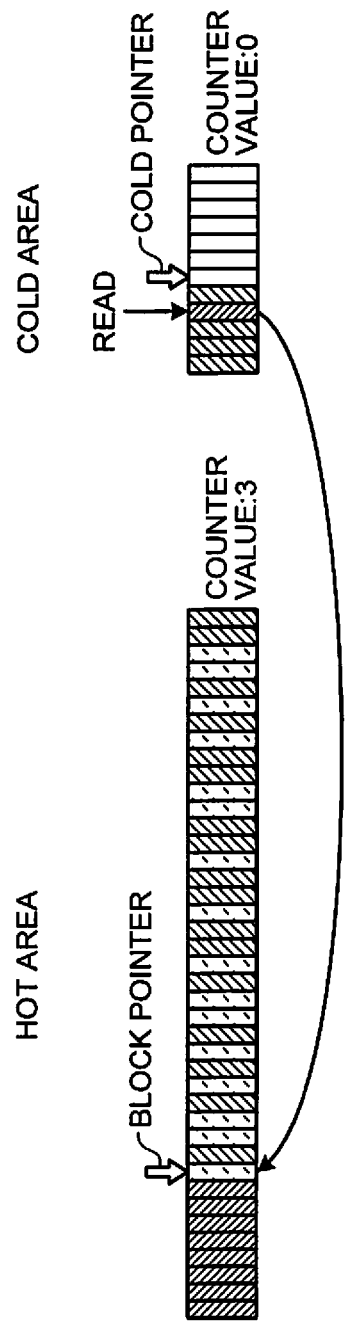
FIG. 26 is a diagram for explaining reading of data in the fourth embodiment.

FIG. 26 is a diagram for explaining reading of data in the fourth embodiment. In the fourth embodiment, the data read from each of the plurality of storage blocks 40 is written in the storage block 40 indicated by the block pointer. Therefore, as illustrated in FIG. 26, the data read from the storage block 40 included in the cold area 92 is rewritten in the storage block 40 indicated by the block pointer among the storage blocks 40 included in the hot area 90.

Figure 27:
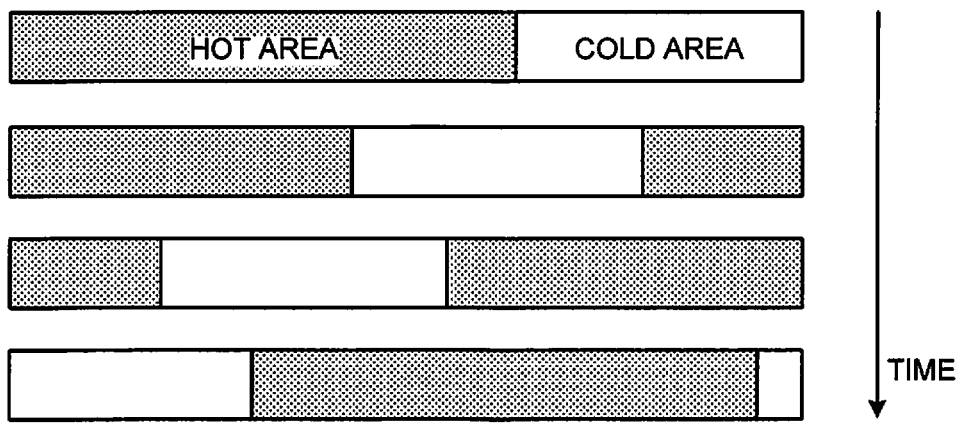
FIG. 27 is a diagram for explaining processing of an area setting unit.

FIG. 27 is a diagram for explaining processing of the area setting unit 96. The area setting unit 96 changes, between the hot area 90 and the cold area 92, allocation of an area to each of the plurality of storage blocks 40 at a predetermined timing. The predetermined timing may be, for example, every constant time or every time the predetermined number of data is written.

The nonvolatile memory 24 may be segmented into the plurality of areas 82 as described in the second embodiment. In this case, the area setting unit 96 may set, as the cold area 92, the area 82 whose counter value is equal to or greater than a predetermined threshold, and set the other area 82 as the hot area 90.

In addition, immediately after the change of area allocation, the area setting unit 96 may move the data stored in the storage block 40 of the cold area 92 to the hot area 90. As a result, the area setting unit 96 can set all the two or more storage blocks 40 included in the cold area 92 to a state in which no valid data is stored immediately after the change of area allocation. In addition, when the storage block 40 in which the data is stored is included in the cold area 92 immediately after the change of area allocation, the area setting unit 96 may handle the storage block 40, in which the data is stored, as the hot area 90 until the data is read.

The number of times of writing of data in the storage block 40 included in the cold area 92 is smaller than that of the storage block 40 included in the hot area 90. Thus, the area setting unit 96 changes, between the hot area 90 and the cold area 92, allocation of an area to each of the plurality of storage blocks 40, thereby equalizing the number of times of writing of data in the plurality of storage blocks 40 included in the nonvolatile memory 24.

As described above, the storage device 20 according to the fourth embodiment can equalize the number of times of writing in each of the two or more storage blocks 40 included in the hot area 90. Further, the storage device 20 according to the fourth embodiment can store data with a low access frequency in each of the two or more storage blocks 40 included in the cold area 92.

Further, the storage device 20 according to the fourth embodiment can perform the writing equally in all the nonvolatile memories 24 by changing, between the hot area 90 and the cold area 92, allocation of an area to each of the plurality of storage blocks 40. As a result, according to the storage device 20, the storage device 20 can level the fatigue of the plurality of storage blocks 40 without concentrating the access to the specific storage block 40.

Fifth Embodiment

Next, an information processing apparatus 10 according to a fifth embodiment will be described.

Figure 28:
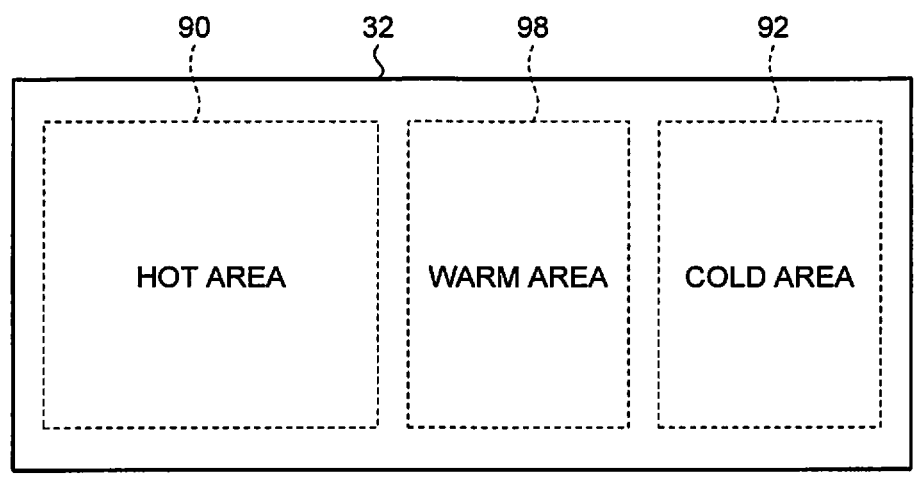
FIG. 28 is a diagram illustrating a memory array according to a fifth embodiment.

FIG. 28 is a diagram illustrating a memory array 32 according to the fifth embodiment. In the fifth embodiment, a nonvolatile memory 24 includes a hot area 90, a warm area 98, and a cold area 92. Each of the plurality of areas 82 is included in any one of the hot area 90, the warm area 98, or the cold area 92. Note that the hot area 90, the warm area 98, and the cold area 92 are not physically segmented in the nonvolatile memory 24, but are logically segmented.

Figure 29:
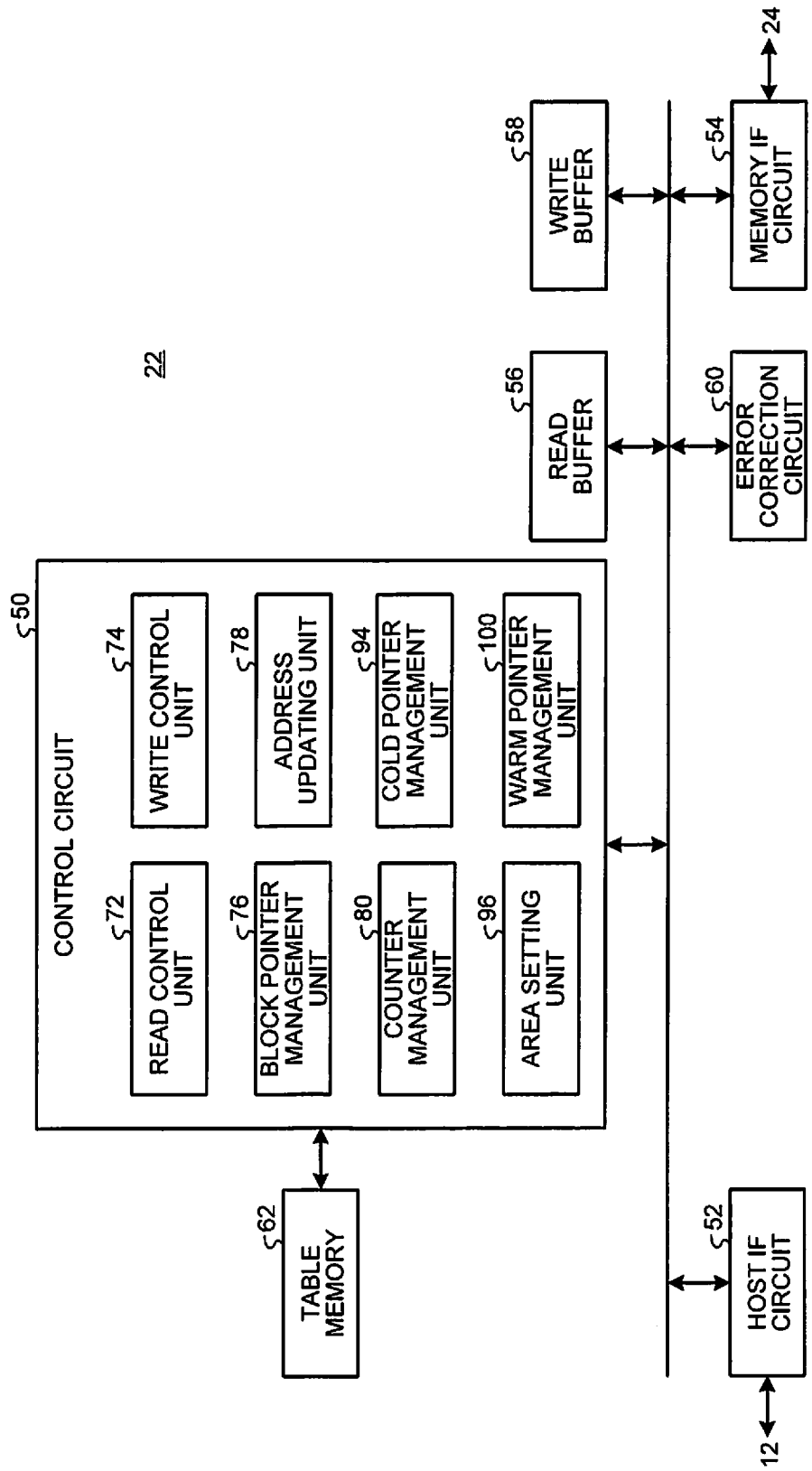
FIG. 29 is a diagram illustrating a configuration of a memory controller according to the fifth embodiment.

FIG. 29 is a diagram illustrating a configuration of a memory controller 22 according to the fifth embodiment. A control circuit 50 according to the fifth embodiment executes a program stored in a ROM or the like to function as a read control unit 72, a write control unit 74, a block pointer management unit 76, an address updating unit 78, a counter management unit 80, a cold pointer management unit 94, an area setting unit 96, and a warm pointer management unit 100. As a result, the control circuit 50 operates as a circuit that includes the read control unit 72, the write control unit 74, the block pointer management unit 76, the address updating unit 78, the counter management unit 80, the cold pointer management unit 94, the area setting unit 96, and the warm pointer management unit 100.

In the fifth embodiment, a block pointer indicates a storage block 40 that is a next write destination among two or more storage blocks 40 included in the hot area 90. The warm pointer management unit 100 manages a warm pointer. The warm pointer indicates a storage block 40 that is a next write destination among two or more storage blocks 40 included in the warm area 98.

The area setting unit 96 allocates the hot area 90, the warm area 98, or the cold area 92 to each of the plurality of storage blocks 40. The area setting unit 96 changes, among the hot area 90, the warm area 98, and the cold area 92, the allocation of an area to each of the plurality of storage blocks 40 at a predetermined timing. In addition, in the fifth embodiment, the counter management unit 80 manages a counter value of the hot area 90, a counter value of the warm area 98, and a counter value of the cold area 92.

Here, in the fifth embodiment, when data is written in the storage block 40 indicated by the block pointer, the block pointer management unit 76 executes the processing illustrated in FIG. 24. However, in processing of S74 for the fifth embodiment, when the valid data is stored in the storage block 40 one ahead in the hot area 90, the block pointer management unit 76 moves the data stored in the storage block 40 one ahead in the hot area 90 to the storage block 40 indicated by the warm pointer.

Further, in the fifth embodiment, when the data stored in the storage block 40 included in the hot area 90 is moved to the storage block 40 indicated by the warm pointer, the warm pointer management unit 100 executes the processing illustrated in FIG. 24. In this processing, the warm pointer management unit 100 executes the processing using the warm pointer instead of the block pointer. In addition, the counter management unit 80 increments the counter value of the warm area 98.

As a result, when the data is moved to the storage block 40 indicated by the warm pointer, the warm pointer management unit 100 cyclically searches the two or more storage blocks 40 included in the warm area 98 in a predetermined order from the storage block 40 indicated by the warm pointer, thereby detecting the storage block 40 one ahead of the storage block 40 indicated by the warm pointer among the two or more storage blocks 40 included in the warm area 98. In addition, the warm pointer management unit 100 updates the warm pointer to indicate the storage block 40 one ahead in the warm area 98. Furthermore, when the valid data is stored in the storage block 40 one ahead in the warm area 98, the warm pointer management unit 100 moves the data stored in the storage block 40 one ahead in the warm area 98 to the storage block 40 indicated by the cold pointer. The warm pointer management unit 100 repeats the detection of the storage block 40 one ahead, the updating of the warm pointer, and the movement of the data until detecting, within the warm area 98, the storage block 40 one ahead in which the valid data is not stored.

Further, in the fifth embodiment, when the data stored in the storage block 40 included in the warm area 98 is moved to the storage block 40 indicated by the cold pointer, the cold pointer management unit 94 executes the processing illustrated in FIG. 10. In this processing, the cold pointer management unit 94 executes the processing using the cold pointer instead of the block pointer. In addition, the counter management unit 80 increments the counter value of the cold area 92.

Therefore, the block pointer management unit 76 performs the cyclic search in a predetermined order from the storage block 40 indicated by the cold pointer, thereby detecting an initial storage block 40, in which the valid data is not stored, among the two or more storage blocks 40 included in the cold area 92. Then, the block pointer management unit 76 changes the cold pointer to indicate the initial storage block 40 in which the valid data is not stored among the two or more storage blocks 40 included in the cold area 92.

Figure 30:
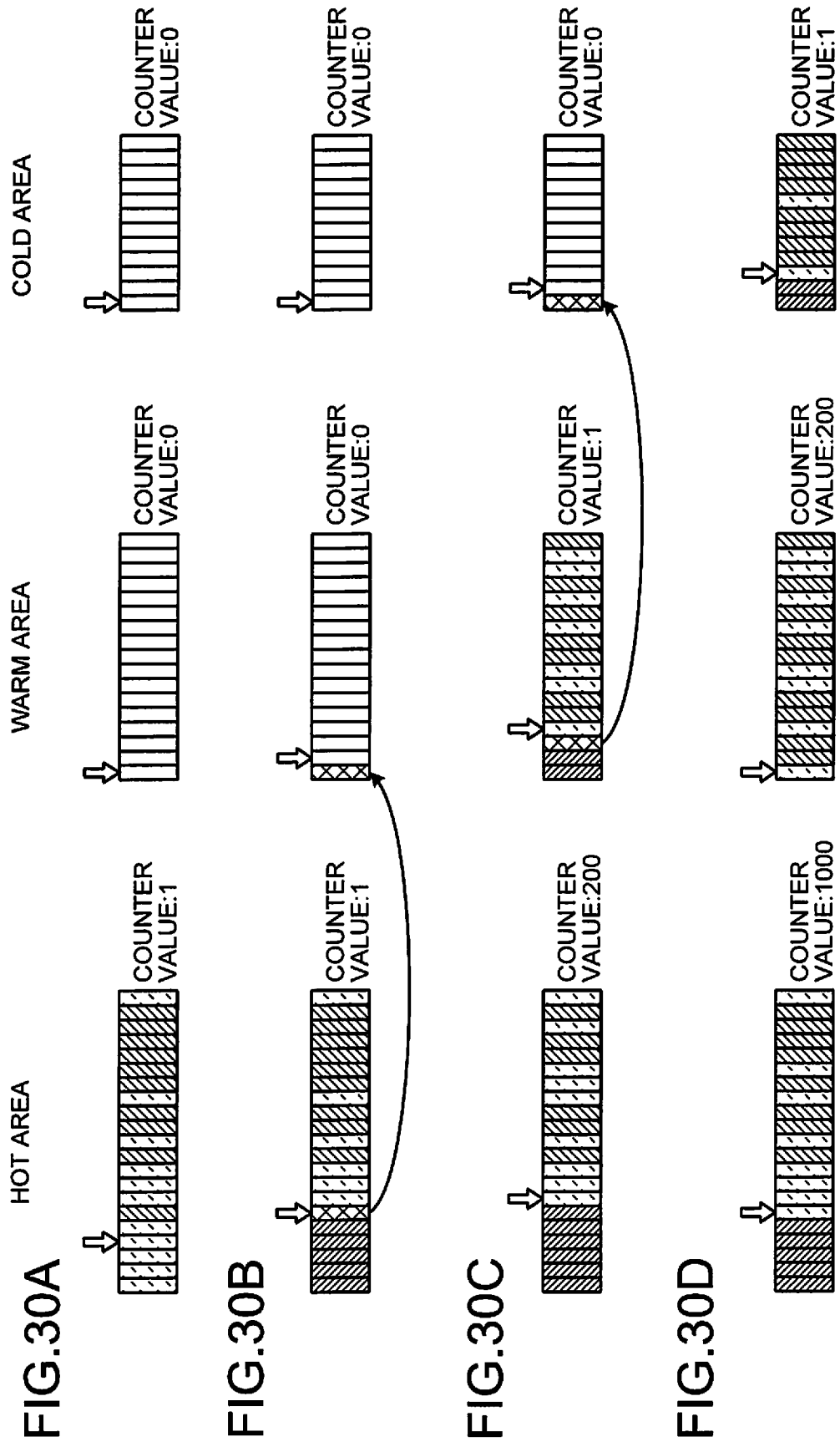
FIGS. 30A to 30D are diagrams for explaining writing, reading, and updating of data in the fifth embodiment.

FIG. 30A to 30D are diagrams for explaining writing, reading, and updating of data in the fifth embodiment. FIG. 30B follows FIG. 30A. FIG. 30C follows FIG. 30B. FIG. 30D follows FIG. 30C.

For example, as illustrated in FIG. 30A, when the storage block 40 one ahead in the hot area 90 is an invalid block, the block pointer is updated to indicate the storage block 40 one ahead as the invalid block.

As illustrated in FIG. 30B, when data is written in the storage block 40 included in the hot area 90, the valid data may be stored in the storage block 40 one ahead of the storage block 40, in which the data is written, in the hot area 90. In this case, the data stored in the storage block 40 one ahead in the hot area 90 is moved to the storage block 40 indicated by the warm pointer. Furthermore, the block pointer is moved one ahead.

In addition, as illustrated in FIG. 30C, the valid data may be stored in the storage block 40 one ahead of the storage block 40, in which data is written, in the warm area 98. In this case, the data stored in the storage block 40 one ahead in the warm area 98 is moved to the storage block 40 indicated by the cold pointer. Furthermore, the warm pointer is moved one ahead.

There is possibility that the storage block 40 included in the hot area 90, the storage block 40 included in the warm area 98, and the storage block 40 included in the cold area 92 are much different in the number of times of writing due to a difference in writing frequency. For example, as illustrated in FIG. 30D, as a result of using the nonvolatile memory 24 for a long time, the counter value of the hot area 90 may be greater than the counter value of the warm area 98. In addition, there is also possibility that the counter value of the warm area 98 becomes greater than the counter value of the cold area 92.

As described above, the storage device 20 according to the fifth embodiment cyclically searches the two or more storage blocks 40 included in the hot area 90 in a predetermined order, so when the storage block 40 is detected in which data is written and then is not read or updated, the data is read from the storage block 40 and is written in the storage block 40 indicated by the warm pointer. As a result, the storage device 20 according to the fifth embodiment can equalize the number of times of writing in each of the two or more storage blocks 40 included in the hot area 90.

In addition, the storage device 20 according to the fifth embodiment cyclically searches the two or more storage blocks 40 included in the warm area 98 in a predetermined order. When the storage block 40 is detected in which data is written and then is not read or updated, the data is read from the storage block 40 and is written in the storage block 40 indicated by the cold pointer. As a result, the storage device 20 according to the fifth embodiment can equalize the number of times of writing in the two or more storage blocks 40 included in the warm area 98.

In addition, the storage device 20 according to the fifth embodiment stores the most frequently accessed data in the hot area 90, stores the next most frequently accessed data in the warm area 98, and stores infrequently accessed data in the cold area 92.

The nonvolatile memory 24 may be allocated an N-stage (N is an integer of 2 or more) warm area 98 having a hierarchical structure. In this case, the data stored in the storage block 40 included in the hot area 90 is moved to a first-stage warm area 98. In addition, data stored in a storage block 40 included in an n-th stage (n is an integer of one or more and (N−1) or less) warm area 98 is moved to a storage block 40 included in an (n+1)-th stage warm area 98. Further, data stored in an N-th stage warm area 98 is moved to the storage block 40 included in the cold area 92. According to such a storage device 20, the number of times of writing for each warm area 98 of each stage can be equalized. Further, such a storage device 20 can store data having a higher access frequency in the first-stage warm area 98 than in the N-th warm area 98.

Sixth Embodiment

Next, an information processing apparatus 10 according to a sixth embodiment will be described.

Figure 31:
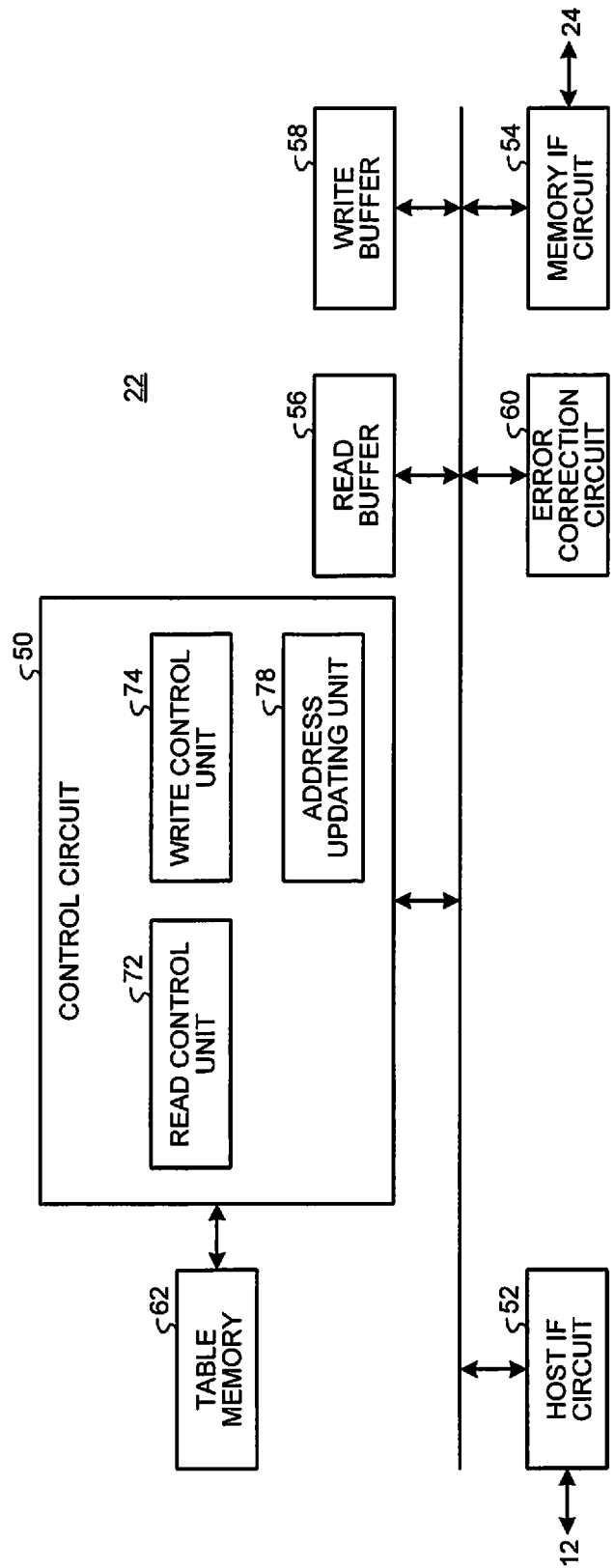
FIG. 31 is a diagram illustrating a configuration of a memory controller according to a sixth embodiment.

FIG. 31 is a diagram illustrating a configuration of a memory controller 22 according to the sixth embodiment. A control circuit 50 according to the sixth embodiment executes a program stored in a ROM or the like to function as a read control unit 72, a write control unit 74, and an address updating unit 78. As a result, the control circuit 50 operates as a circuit that includes the read control unit 72, the write control unit 74, and the address updating unit 78.

In the sixth embodiment, each of the plurality of storage blocks 40 included in the nonvolatile memory 24 is a first-in, first-out (FIFO) shift register. Therefore, the control circuit 50 can simultaneously execute write processing and read processing on each of the plurality of storage blocks 40.

In the sixth embodiment, when the read control unit 72 reads read target data from any one of the plurality of storage blocks 40, the write control unit 74 reads write target data, which is stored in a write buffer 58, in the storage block 40 from which the read target data is read is written in parallel with the read processing.

FIG. 32A to 32E are diagrams for explaining writing, reading, and updating of data in the sixth embodiment. FIG. 32B follows FIG. 32A. FIG. 32C follows FIG. 32B. FIG. 32D follows FIG. 32C. FIG. 32E follows FIG. 32D. The write buffer 58 temporarily stores the write target data to be written in the nonvolatile memory 24. In addition, a read buffer 56 temporarily stores the read target data read from the nonvolatile memory 24. The read target data temporarily stored in the read buffer 56 is transmitted to a host controller 12.

Further, the read control unit 72 moves the read target data, which is read from the nonvolatile memory 24, from the read buffer 56 to the write buffer 58, and stores the read target data as the write target data in the write buffer 58. Then, the write control unit 74 writes the write target data temporarily stored in the write buffer 58 in any of the storage blocks 40 of the nonvolatile memory 24. As a result, the control circuit 50 can rewrite the data read from the nonvolatile memory 24 in the nonvolatile memory 24 again.

Here, as illustrated in FIG. 32A, when a write command instructing writing of new data is received from the host controller 12, the write control unit 74 temporarily stores the new data in the write buffer 58 as the write target data.

Subsequently, as illustrated in FIG. 32B, when the next write command is received from the host controller 12, the write control unit 74 writes the write target data stored in the write buffer 58 in the storage block 40, in which the valid data is not stored, among the plurality of storage blocks 40. At the same time, the write control unit 74 temporarily stores next new data in the write buffer 58 as the write target data.

Here, as illustrated in FIG. 32C, there is a case where a read command is received from the host controller 12 in a state in which the write buffer 58 temporarily stores the write target data. In this case, the read control unit 72 reads data from the storage block 40, in which the read target data specified by the read command is stored, among the plurality of storage blocks 40.

Further to the case above, as illustrated in FIG. 32D, the write control unit 74 writes, in parallel with the read processing, the write target data stored in the write buffer 58 in the storage block 40 from which the read target data is read. As a result, as illustrated in FIG. 32E, the write control unit 74 can complete the write processing at the timing when the read processing by the read control unit 72 is completed.

As described above, the storage device 20 according to the sixth embodiment can execute the write processing on the storage block 40 in parallel with the read processing. As a result, the storage device 20 according to the sixth embodiment can reduce the number of accesses to the storage block 40 and reduce a deterioration speed of the storage block 40. For example, when the nonvolatile memory 24 that magnetically stores information using a principle of magnetic domain wall shift is provided, the storage device 20 can reduce the number of times of supply of a shift pulse current to the storage block 40 even when executing the read processing and the write processing separately. Therefore, the storage device 20 can reduce the fatigue of the storage block 40 by executing the read processing and the write processing on the storage block 40 in parallel, and as a result, can reduce the fatigue speed of the storage block 40.

Seventh Embodiment

Next, an information processing apparatus 10 according to a seventh embodiment will be described.

Figure 33:
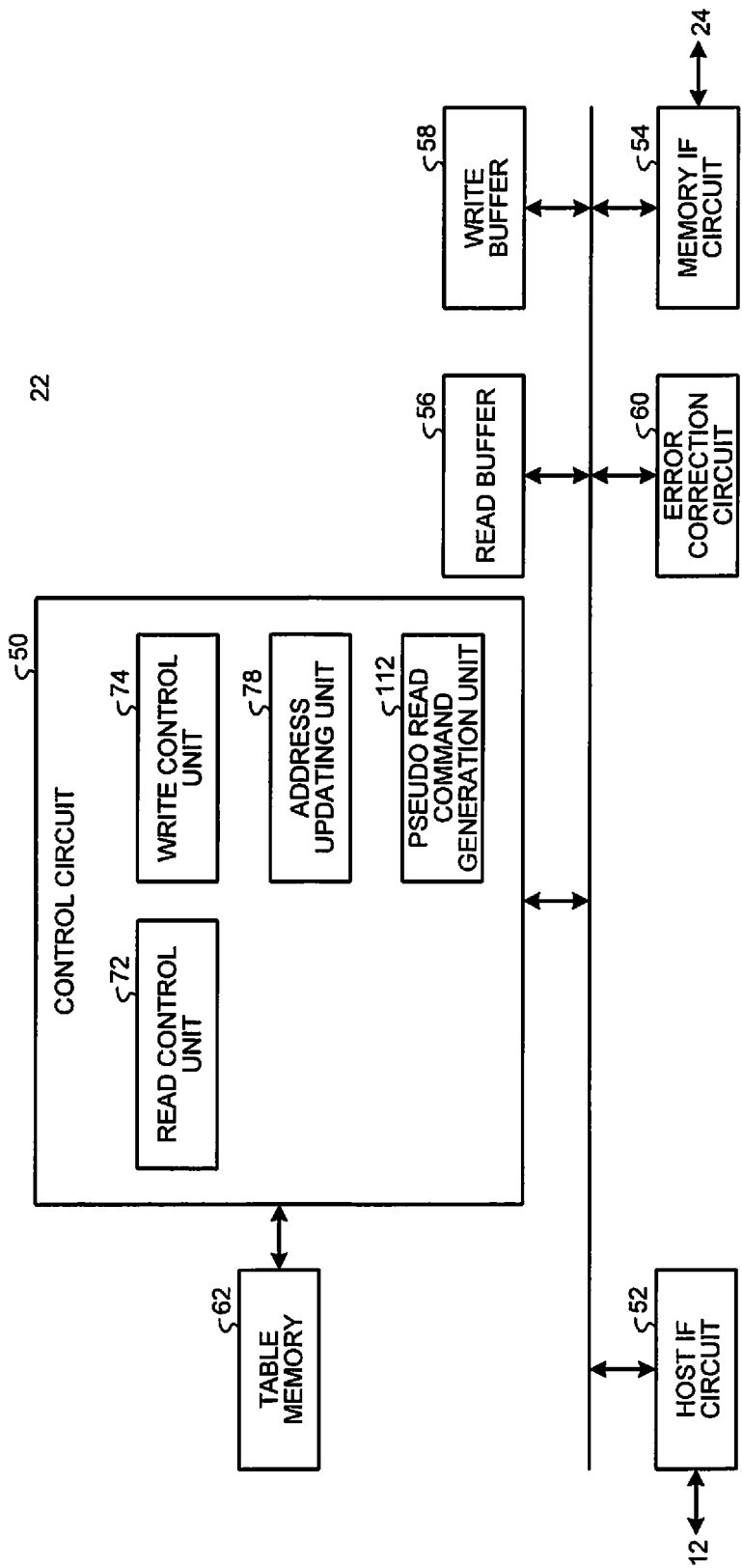
FIG. 33 is a diagram illustrating a configuration of a memory controller according to a seventh embodiment.

FIG. 33 is a diagram illustrating a configuration of a memory controller 22 according to the seventh embodiment. A control circuit 50 according to the seventh embodiment executes a program stored in a ROM or the like to function as a read control unit 72, a write control unit 74, an address updating unit 78, and a pseudo read command generation unit 112. As a result, the control circuit 50 operates as a circuit that includes the read control unit 72, the write control unit 74, the address updating unit 78, and the pseudo read command generation unit 112.

In comparison with the control circuit 50 according to the foregoing sixth embodiment, the control circuit 50 according to the seventh embodiment is configured to further include the pseudo read command generation unit 112. The pseudo read command generation unit 112 generates, at a predetermined timing, a pseudo read command that instructs to read data from any of the plurality of storage blocks 40.

When the read command is received from the host controller 12, the read control unit 72 reads read target data from the storage block 40 in which the read target data is stored. Furthermore, when the pseudo read command generation unit 112 generates the pseudo read command, the read control unit 72 reads data from the storage block 40 indicated by the pseudo read command.

Figure 34:
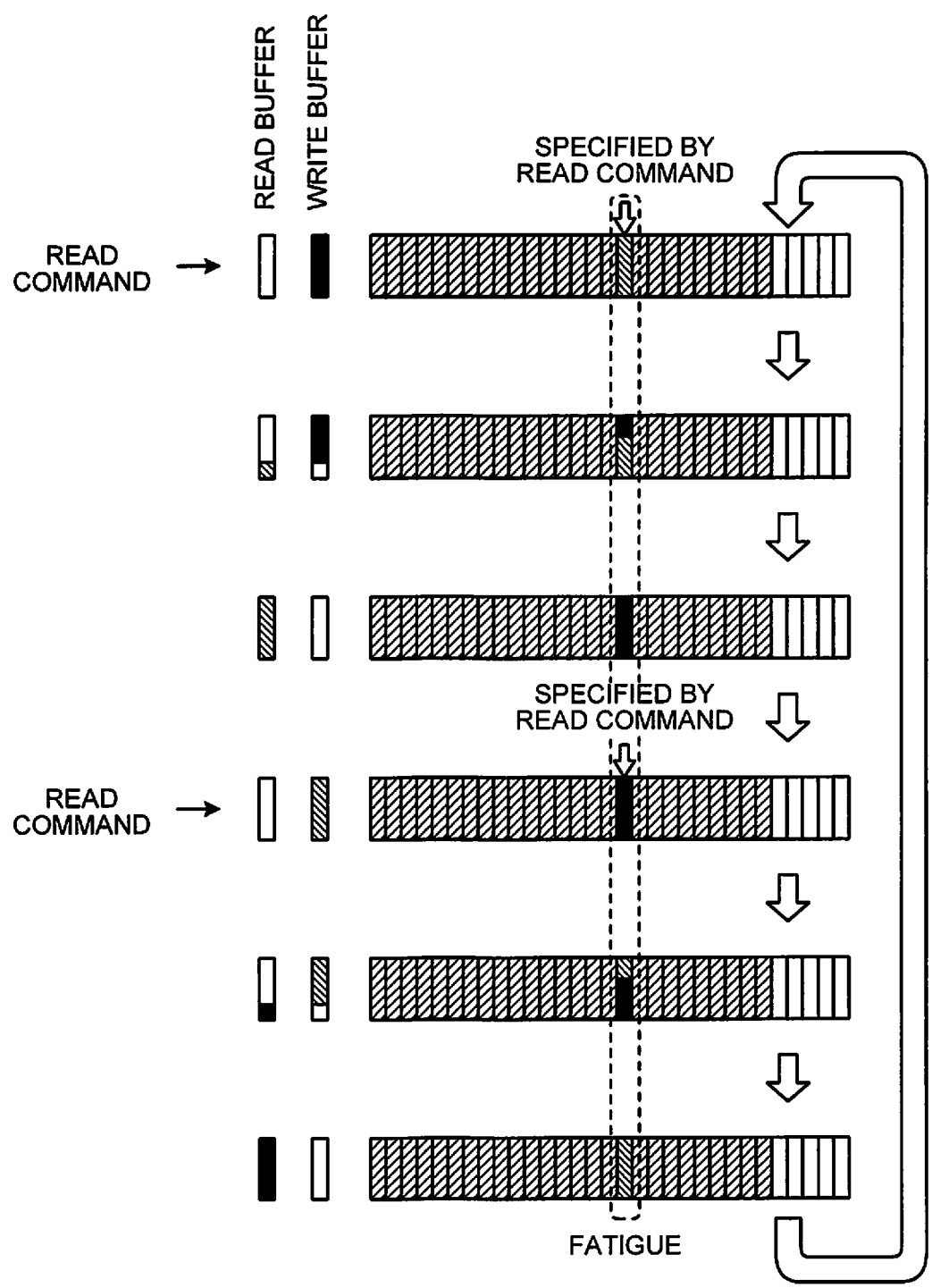
FIG. 34 is a diagram illustrating a state in which two pieces of data are alternately read when no pseudo read command is generated.

FIG. 34 is a diagram illustrating a state in which two pieces of data are alternately read when no pseudo read command is generated.

When two pieces of data are alternately read by the host controller 12 in a condition where the pseudo read command has not been generated, the read control unit 72 and the write control unit 74 repeatedly execute the write processing and the read processing on the storage block 40 having the same physical address. As a result, the storage block 40 in which the write processing and the read processing are repeatedly executed is further fatigued.

Figure 35:
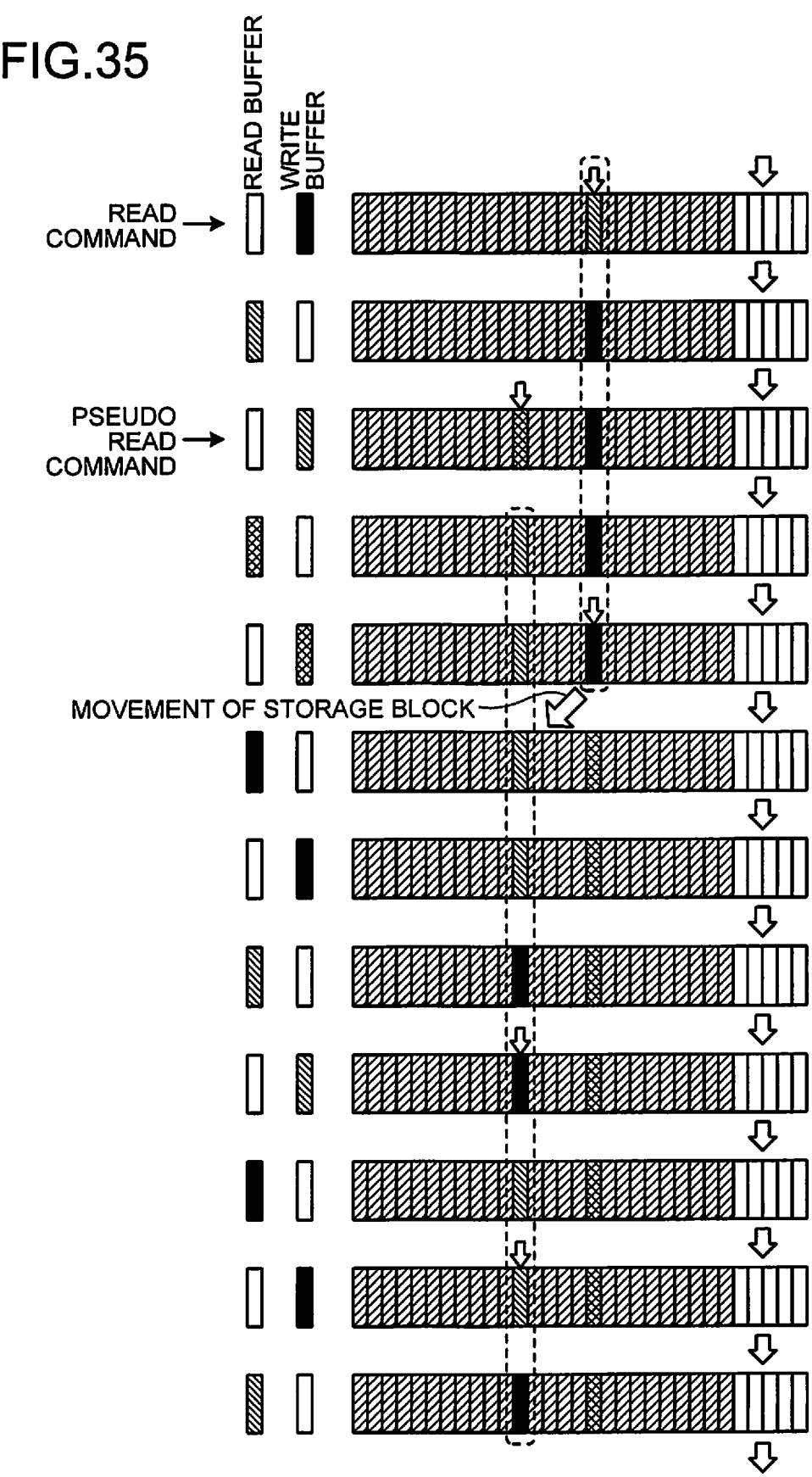
FIG. 35 is a diagram illustrating a state in which two pieces of data are alternately read when a pseudo read command is generated.

FIG. 35 is a diagram illustrating a state in which two pieces of data are alternately read when a pseudo read command is generated.

The pseudo read command generation unit 112 generates, at a predetermined timing, the pseudo read command that instructs to read data from any of the plurality of storage blocks 40. Therefore, even when two pieces of data are alternately read by the host controller 12, the pseudo read command generation unit 112 can move the storage block 40 in which the write processing and the read processing are repeatedly executed. Therefore, the pseudo read command generation unit 112 can avoid the fatigue from being concentrated on the specific storage block 40.

The pseudo read command generation unit 112 generates the pseudo read command every predetermined period. In addition, the pseudo read command generation unit 112 may generate the pseudo read command at a random timing, for example.

Further, the pseudo read command generation unit 112 may generate the pseudo read command every time the read command is received by the predetermined number of times. Further, for example, the pseudo read command generation unit 112 may generate the pseudo read command every time random pieces of the read command are received.

Figure 36:
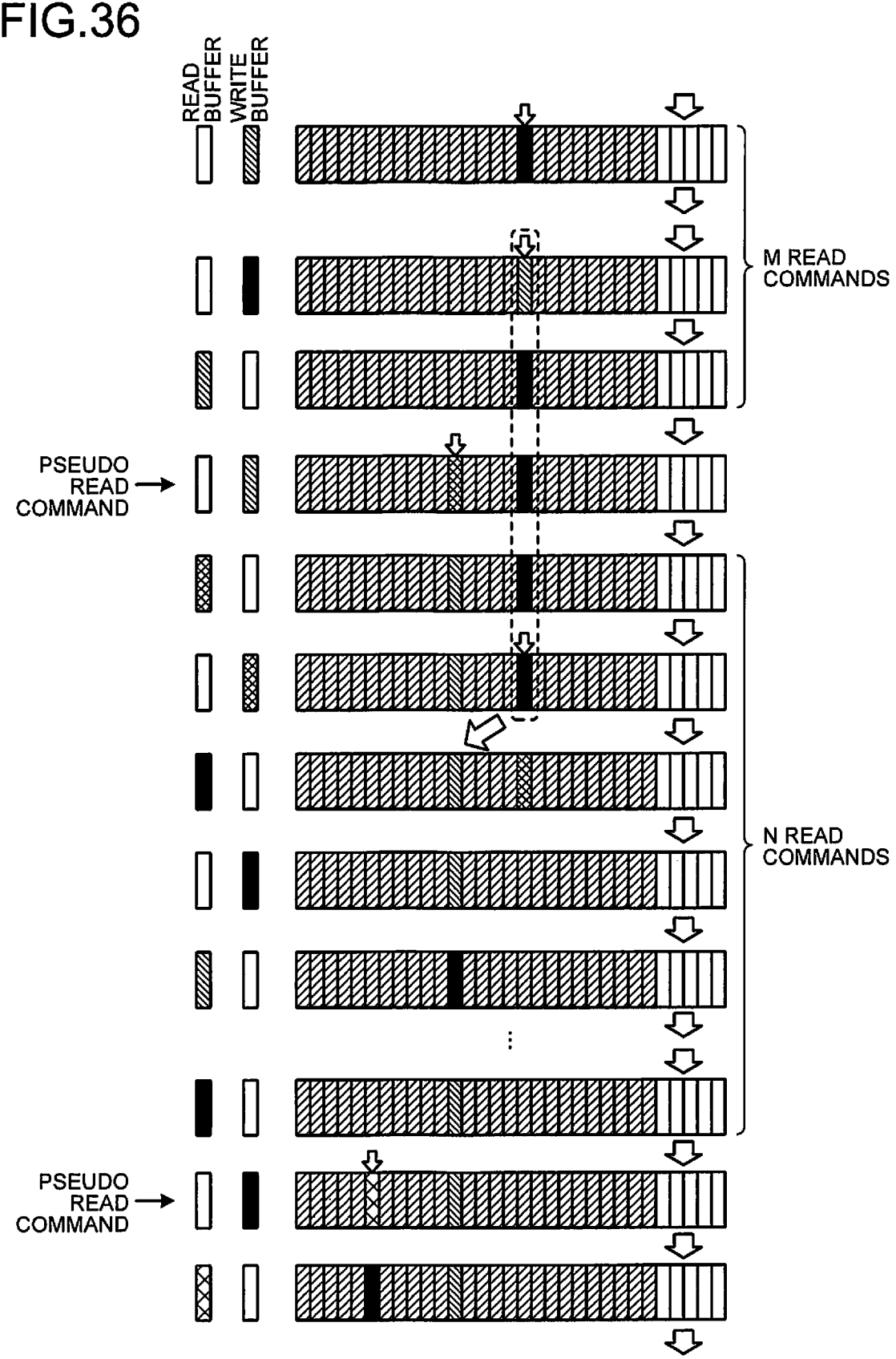
FIG. 36 is a diagram illustrating a processing example that is a diagram illustrating an example of a generation pattern of a pseudo read command.

FIG. 36 is a diagram illustrating an example of a generation pattern of the pseudo read command. The pseudo read command generation unit 112 may also generate the pseudo read command by alternately repeating a first processing and a second processing.

In the first processing, the pseudo read command generation unit 112 generates the pseudo read command after receiving M read commands (M is an integer of 2 or more). In addition, in the second processing, the pseudo read command generation unit 112 generates the pseudo read command after receiving N read commands (N is an integer of 2 or more).

Here, M and N are a relative prime. By executing such processing, the pseudo read command generation unit 112 can avoid access from concentrating the specific storage block 40 even when, for example, the host controller 12 executes a malicious program that concentrates access to the specific storage block 40.

As described above, the storage device 20 according to the seventh embodiment can avoid the concentration of the fatigue on the specific storage block 40 when performing the write processing in parallel with the read processing on the storage block 40. As a result, the storage device 20 according to the seventh embodiment can relax the concentration of the fatigue on the specific storage block 40 among the plurality of storage blocks 40.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invent ions.

What is claimed is:

1. A storage device comprising:
a nonvolatile memory including a plurality of storage blocks, each of the plurality of storage blocks including a shift register; and
a control circuit configured to control writing and reading of data to and from the nonvolatile memory,
wherein the control circuit is configured to:
manage a block pointer indicating a storage block as a next write destination among the plurality of storage blocks;
update an address conversion table in which a correspondence between a logical address and a physical address is registered for each data stored in each of the plurality of storage blocks;
read target data from a first storage block of the plurality of storage blocks;
write the target data read from the first storage block to a storage block indicated by the block pointer among the plurality of storage blocks; and
change a physical address of the target data registered in the address conversion table to a physical address of the storage block indicated by the block pointer.

2. The storage device according to claim 1, further comprising an error
correction circuit that performs error correction processing on the target data read from the first storage block.

3. The storage device according to claim 1, wherein the control circuit is configured to:
   detect, when the target data is written, an initial storage block in which valid data is not stored among the plurality of storage blocks by cyclically searching the plurality of storage blocks in a predetermined order from the storage block indicated by the block pointer; and
   update the block pointer to indicate the detected initial storage block.

4. The storage device according to claim 1, wherein
   the nonvolatile memory is segmented into a plurality of areas,
   each of the plurality of storage blocks is included in any one of the plurality of areas,
   the control circuit is configured to:
      manage an area pointer indicating a target area as a next write destination among the plurality of areas;
      detect, when the target data is written, an initial storage block in which valid data is not stored among two or more storage blocks included in the target area by searching the two or more storage blocks included in the target area among the plurality of storage blocks in a predetermined order from the storage block indicated by the block pointer to a tail storage block in the target area;
      update the block pointer to indicate the detected initial storage block;
      select, when the searching reaches the tail storage block, one of the plurality of areas as a new target area;
      update the area pointer to indicate the selected new target area; and,
      when the searching reaches the tail storage block, continue to detect the initial storage block by updating the block pointer to indicate a head storage block among the two or more storage blocks included in the new target area.

5. The storage device according to claim 4, wherein the control circuit is configured to:
   manage, for each of the plurality of areas, a number of empty blocks indicating a number of storage blocks in which valid data is not stored; and
   select, when the searching reaches the tail storage block in the target area, one of the plurality of areas as the new target area based on the number of empty blocks of each of the plurality of areas.

6. The storage device according to claim 5, wherein the control circuit is configured to select, as the new target area among the plurality of areas, an area whose number of empty blocks is equal to or greater than a predetermined value.

7. The storage device according to claim 5, wherein
   the control circuit is configured to select, as the new target area, an area having a larger vacancy rate than a margin rate among the plurality of areas,
   the margin rate represents a ratio of the number of empty blocks in the nonvolatile memory to the number of all storage blocks to which data in the nonvolatile memory is written, and
   the vacancy rate represents a ratio of the number of empty blocks to the number of storage blocks included in the area.

8. The storage device according to claim 5, wherein the control circuit is configured to select, as the new target area, an area among the plurality of areas that has a highest vacancy rate, the vacancy rate representing a ratio of the number of empty blocks to the number of included storage blocks.

9. The storage device according to claim 4, wherein the control circuit is configured to:
   manage a counter value representing the number of times of writing for each of the plurality of areas, and
   select, as the new target area among the plurality of areas, an area whose counter value is smaller than a predetermined value.

10. The storage device according to claim 9, wherein, when a variance of the counter values of the plurality of areas is greater than a predetermined value, the control circuit is configured to move, among the plurality of areas, a data group stored in an area whose counter value is smaller than a predetermined first reference value to another area whose counter value is greater than a predetermined second reference value.

11. The storage device according to claim 1, wherein the control circuit is configured to:
   execute a detection process to detect, among the plurality of storage blocks, a storage block one ahead of the storage block and a storage block two ahead of the storage block indicated by the block pointer by cyclically searching the plurality of storage blocks in a predetermined order from the storage blocks indicated by the block pointer;
   execute an update process to update the block pointer to indicate the storage block one ahead;
   execute a move process to move data stored in the storage block two ahead to the storage block one ahead when valid data is stored in the storage block two ahead; and
   repeat the detection process, the update process, and the move process until detecting the storage block two ahead in which valid data is not stored.

12. The storage device according to claim 1, wherein
   the nonvolatile memory includes a hot area and a cold area,
   each of the plurality of storage blocks is included in either the hot area or the cold area,
   the block pointer indicates a storage block as a next write destination among two or more storage blocks included in the hot area,
   the control circuit is configured to:
      manage a cold pointer indicating a storage block as a next write destination among two or more storage blocks included in the cold area;
      execute, when the target data is written, a first detection process to detect the storage block one ahead of the storage block indicated by the block pointer among the two or more storage blocks included in the hot area by cyclically searching the two or ore storage blocks included in the hot area in a predetermined order from the storage blocks indicated by the block pointer;
      execute a first update process to update the block pointer to indicate the storage block one ahead included in the hot area;
      execute, when valid data is stored in the storage block one ahead included in the hot area, a first move process to move the data stored in the storage block one ahead included in the hot area to the storage block indicated by the cold pointer; and repeat the first detection process, the first update process, and the first move process until detecting, within the hot area, the storage block one ahead in which valid data is not stored.

13. The storage device according to claim 12, wherein, when the data is moved to the storage block indicated by the cold pointer, the control circuit is configured to:
detect, from the two or more storage blocks included in the cold area, an initial storage block in which valid data is not stored by cyclically searching the two or more storage blocks included in the cold area in a predetermined order from the storage block indicated by the cold pointer; and
change the cold pointer to indicate the detected initial storage block.

14. The storage device according to claim 12, wherein the control circuit is configured to change, between the hot area and the cold area, allocation of an area to each of the plurality of storage blocks at a predetermined timing.

15. The storage device according to claim 12, wherein the nonvolatile memory further includes a warm area, each of the plurality of storage blocks is included in either the hot area, the warm area, or the cold area, the control circuit is configured to:
manage a warm pointer indicating a storage block as a next write destination among two or more storage blocks included in the warm area;
move, when valid data is stored in the storage block one ahead in the hot area, the data stored in the storage block one ahead in the hot area to the storage block indicated by the warm pointer;
execute, when the data is moved to the storage block indicated by the warm pointer, a second detection process to detect the storage block one ahead of the storage block indicated by the warm pointer among the two or more storage blocks included in the warm area by cyclically searching the two or more storage blocks included in the warm area in a predetermined order from the storage blocks indicated by the warm pointer;
execute a second update process to update the warm pointer to indicate the storage block one ahead in the warm area;
execute, when valid data is stored in the storage block one ahead in the warm area, a second move process to move the data stored in the storage block one ahead in the warm area to the storage block indicated by the cold pointer; and
repeats the second detection process, the second update process, and the second move process until detecting, within the warm area, the storage block one ahead in which valid data is not stored.

16. A storage device comprising:
a nonvolatile memory including a plurality of storage blocks, each of the plurality of storage blocks including a shift register;
a write buffer that stores write target data to be written in the nonvolatile memory; and
a control circuit configured to control writing and reading of data to and from the nonvolatile memory, wherein
each of the plurality of storage blocks includes a first-in, first-out shift register, and
the control circuit is configured to:
read target data from a first storage block of the plurality of storage blocks;
write the target data read from the first storage block to a second storage block of the plurality of storage blocks, the second storage block being different from the first storage block; and
when executing read processing to read read target data from any one of the plurality of storage blocks, write, in parallel with the read processing, the write target data of the write buffer in the any one of the storage blocks from which the read target data is read.

17. The storage device according to claim 16, wherein the control circuit is configured to:
generate a pseudo read command instructing to read data from any one of the plurality of storage blocks;
read, when read command is received from a host controller, the read target data from the storage block in which the read target data has been stored; and
read, when the pseudo read command is generated, data from the storage block indicated by the pseudo read command.

18. The storage device according to claim 17, wherein the control circuit is configured to generate the pseudo read command every time the read command is received a predetermined number of times.

19. The storage device according to claim 17, wherein the control circuit is configured to generate the pseudo read command every time random pieces of the read command are received.

20. The storage device according to claim 17, wherein the control circuit is configured to alternately repeats
first processing to generate the pseudo read command after M (M is an integer of 2 or more) read commands are received, and
second processing to generate the pseudo read command after N (N is an integer of 2 or more, and M and N are a relative prime) read commands are received.

21. A memory controller controlling writing and reading of data to and from a nonvolatile memory including a plurality of storage blocks, each including a shift register, the memory controller comprising:
a processing circuit configured to:
manage a block pointer indicating a storage block as a next write destination among the plurality of storage blocks;
update an address conversion table in which a correspondence between a logical address and a physical address is registered for each data stored in each of the plurality of storage blocks;
read target data from a first storage block of the plurality of storage blocks;
write the target data read from the first storage block to a storage block indicated by the block pointer among the plurality of storage blocks; and
change a physical address of the target data registered in the address conversion table to a physical address of the storage block indicated by the block pointer.

22. A memory controller controlling writing and reading of data to and from a nonvolatile memory including a plurality of storage blocks, each including a shift register, wherein
each of the plurality of storage blocks includes a first-in, first-out shift register, and
the memory controller comprises a processing circuit configured to:
write, in a write buffer, write target data to be written in the nonvolatile memory;
read target data from a first storage block of the plurality of storage blocks;
write the target data read from the first storage block to a second storage block of the plurality of storage blocks, the second storage block being different from the first storage block; and when executing read processing to read read target data from any one of the plurality of storage blocks, write, in parallel with the read processing, the write target data of the write buffer in the any one of the storage blocks from which the read target data is read.

23. A memory controller controlling writing and reading of data to and from a nonvolatile memory including a plurality of storage blocks, each including a shift register, the memory controller comprising:

a processing circuit configured to:

read target data with parity from a first storage block of the plurality of storage blocks;

cause an error correction circuit to perform error correction processing, by using the parity, on the target data read from the first storage block;

cause the error correction circuit to generate new parity for the target data on which the error correction processing is performed; and write the target data with the new parity in a second storage block of the plurality of storage blocks, the second storage block being different from the first storage block.

* * * * *